US012692073B2

(12) United States Patent
    Los

(10) Patent No.: US 12,692,073 B2
(45) Date of Patent: Jul. 28, 2026

(54) AUTOMATED POSTAL LOGISTICS MODULE, METHOD, AND NETWORK FOR AUTOMATED POSTAL DELIVERY SERVICES

(71) Applicant: UAB EEC Engineering, Vilnius (LT)

(72) Inventor: Siarhei Los, Vilnius (LT)

(73) Assignee: UAB EEC ENGINEERING, Vilnius (LT)

( * ) Notice: Subject to any disclaimer, the term of this patent is extended or adjusted under 35 U.S.C. 154(b) by 366 days.

(21) Appl. No.: 18/469,350

(22) Filed: Sep. 18, 2023

(65) Prior Publication Data

US 2024/0092575 A1      Mar. 21, 2024

(30) Foreign Application Priority Data

Sep. 20, 2022    (EP) .................................... 22196736

(51) Int. Cl.
    B65G 1/04        (2006.01)
    B65G 67/08       (2006.01)
    G06Q 50/60       (2024.01)
(52) U.S. Cl.
    CPC ......... B65G 1/0492 (2013.01); B65G 1/0464 (2013.01); B65G 67/08 (2013.01); G06Q 50/60 (2024.01)
(58) Field of Classification Search
    CPC .. B65G 1/0492; B65G 1/0464; B65G 1/0435; B65G 1/0407; B65G 1/0414;
    (Continued)

(56) References Cited

U.S. PATENT DOCUMENTS 2,096,958 A  *  10/1937  Clerc ..................... E04G 21/161
                                                          104/30
9,598,238 B2    3/2017  Kadaba et al.
                (Continued)

FOREIGN PATENT DOCUMENTS

CN        107835776 A      3/2018
CN        207851985 U      9/2018
                (Continued)

OTHER PUBLICATIONS

Wikipedia Webpage: Parcel Locker, downloaded Sep. 18, 2023, 9 pages.

(Continued)

*Primary Examiner* — Glenn F Myers
(74) *Attorney, Agent, or Firm* — NIXON & VANDERHYE

(57) ABSTRACT

Disclosed is an automated postal logistic module, APLM for postal delivery services. This APLM is a generic device for building automated postal networks. The APLM can be configured either as Automated Postal Access Point, APAP for users, or Automated Postal Network Node, APNN or Automated Cargo Compartment on a postal Vehicle, ACCV for transporting postal items in parcelboxes, where functional and constructional features of APAPs, APNNs and ACCVs are similar or identical. A plurality of APAPs, APNNs, and ACCVs, together with their control system, constitutes a postal network for automatic delivery of parcelboxes, where routing and logistics are conducted in a homogeneous technological environment. Due to the automated delivery, a contactless transfer, increased quality, and cost reduction of postal delivery services can be achieved.

19 Claims, 21 Drawing Sheets

(58) Field of Classification Search
CPC ...... B65G 1/0485; B65G 1/137; B65G 67/08;
B65G 67/04; B65G 67/02; B65G 63/045;
G06Q 50/60; G06Q 10/08; G06Q 10/083;
G06Q 10/08365
USPC ........................................................ 414/279
See application file for complete search history.

(56) References Cited

U.S. PATENT DOCUMENTS

|  |  |  |  |  |
|---|---|---|---|---|
| 9,990,684 | B2 | 6/2018 | Hejazi | |
| 10,503,164 | B2 | 12/2019 | Ibe | |
| 10,551,851 | B2 | 2/2020 | Yu et al. | |
| 10,647,508 | B2 | 5/2020 | Eck et al. | |
| 10,780,814 | B2 | 9/2020 | Hempsch et al. | |
| 2010/0026452 | A1 | 2/2010 | Wilms et al. | |
| 2015/0321595 | A1 | 11/2015 | Hempsch et al. | |
| 2018/0362187 | A1 | 12/2018 | Pruski et al. | |
| 2021/0387808 | A1* | 12/2021 | Kalouche | G06Q 10/083 |
| 2022/0204260 | A1* | 6/2022 | Zhou | B60P 7/06 |
| 2022/0348427 | A1* | 11/2022 | Bell | B62D 33/02 |
| 2022/0396192 | A1* | 12/2022 | Paul | B66F 9/063 |
| 2023/0303328 | A1* | 9/2023 | Gil | B60P 3/007 |

FOREIGN PATENT DOCUMENTS

|  |  |  |  |
|---|---|---|---|
| EP | 3254893 | A1 | 12/2017 |
| EP | 3511886 | A1 | 7/2019 |
| EP | 3287400 | B1 | 12/2019 |
| EP | 3670007 | A1 | 6/2020 |
| EP | 3508444 | B1 | 7/2020 |
| JP | 6438911 | B2 | 11/2018 |
| WO | 2017191695 | A1 | 11/2017 |
| WO | 2018196574 | A1 | 11/2018 |
| WO | 2020063120 | A1 | 4/2020 |

OTHER PUBLICATIONS

Evan Ackerman, "Swiss Considering $3.4 Billion Cargo Tunnel for Automated Delivery Trucks > Goods zipping along underground in little robot cars would clear trucks off of congested Swiss roads", IEEE Spectrum, Feb. 1, 2016, 5 pages, at URL: https://spectrum. ieee.org/cars-that-think/transportation/infrastructure/swiss-considering-34-billion-cargo-tunnel-for-automated-delivery-trucks.
Webpage: Cargo Sous Terrain, Underground digitalized logistics system, printed Sep. 18, 2023, 6 pages, at URL: Cargo Sous Terrain—http://www.cargosousterrain.ch/fr/accueil-fr.htm.

* cited by examiner

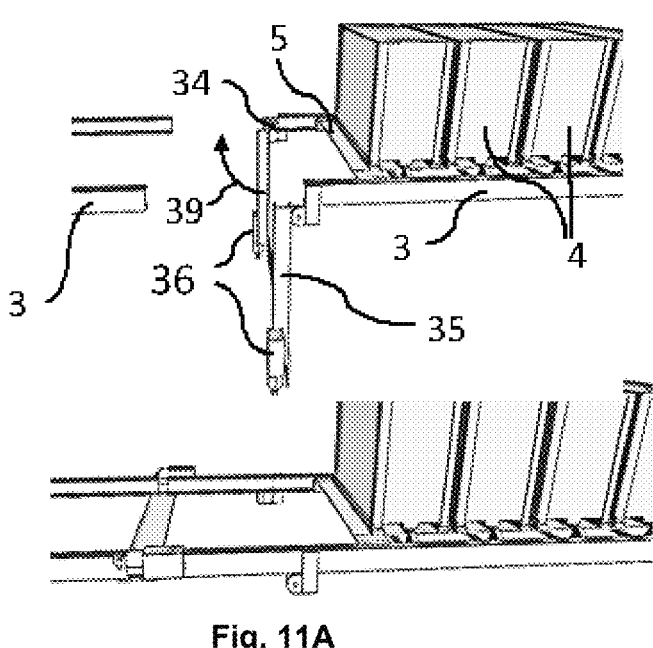
Fig. 11A
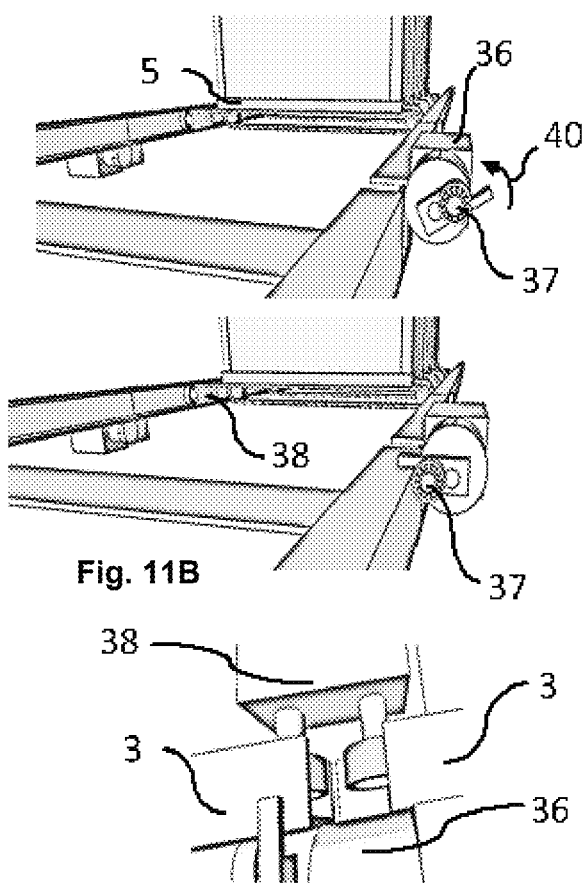
Fig. 11B
Fig. 11C

AUTOMATED POSTAL LOGISTICS MODULE, METHOD, AND NETWORK FOR AUTOMATED POSTAL DELIVERY SERVICES

CROSS-REFERENCE TO RELATED APPLICATIONS

This application claims the priority under 35 USC 119(a) of EP application EP22196736.7 filed on Sep. 20, 2022, the entirety of which is incorporated herein by reference.

FIELD OF INVENTION

This invention relates to the technologies of postal delivery services. Specifically, it discloses an automated postal logistic module (APLM), and a postal network based on a plurality of such APLMs, arranged to deliver postal items over the network in an automated or fully automatic manner.

BACKGROUND ART

Postal and parcel delivery services are of great importance in recent days. They grow rapidly, being stimulated by demands from e-commerce, worldwide delivery of goods, the need for contactless delivery, etc. Consequently, this also requires reducing costs and increasing speeds of delivery, preferably, excluding human labor in chains of postal delivery services. Development of this field of technology is determined at least by:

the increasing number of e-commerce consumers, consequently, increasing numbers of shipments;

the need to minimize costs of the delivery of postal items and parcels;

limited amount of the space in human settlements, available for the development of postal items and commercial parcels delivery services;

broad-scale development of the use of digital devices (smartphones and similar devices) for identification, confirmation, and calculation processes;

the need for social distancing, for example, caused by epidemic situations.

There are known technologies and solutions in this field that are further developed to:

expand the range of consumers, who could receive items through e-commerce;

increase availability of postal delivery services: reduce the walking distance to the customers, to provide 24×7 access to the postal services;

accelerate the delivery of postal items and parcels;

provide contactless delivery;

reduce costs of postal delivery services;

implement a direct exchange of delivered items between consumers and delivery networks;

facilitate temporal storage of postal items and parcels until their reception;

automate processes and maintenance of postal delivery networks.

With the development of automation and robotics, automated processes effectively come also to postal and parcel delivery services. There is a variety of technologies known and disclosed by their use in postal and parcel delivery services.

The "last mile" delivery using postal terminals and postal shuttles is disclosed in several patent documents. The PCT application WO2020063120A1 discloses a self-service parcel cabinet, comprising: a main part, a sorting apparatus, a shutoff apparatus (3), and a master control device. The main part is a hollow structure opened at the top. The self-service parcel cabinet transfers the parcel delivered by a drone to the corresponding self-service parcel locker and facilitates the implementation of the automation of parcel delivery.

The U.S. Pat. No. 10,551,851B2 discloses an autonomous unmanned road vehicle and how it can be used to make deliveries. The unmanned vehicle is capable of operating autonomously on paved roadways. The vehicle has a control system for autonomous driving and a perception system for detecting objects in its surroundings. The vehicle also has one or more cargo compartments for carrying the delivery items. In consideration that the vehicle does not carry passengers, the size and/or motor power of the vehicle may be reduced as compared to conventional passenger vehicles.

The DHL Packstation provides automated booths for a self-service collection of parcels and oversize letters as well as self-service of dispatching parcels 24×7. Packstation started as a pilot project in 2001 and was quickly expanded. There are 3,000 Packstation machines in Germany[1] and 90 percent of the people living in Germany were within ten minutes of a DHL Packstation. Only ordinary parcels and letters delivered by Deutsche Post can be delivered to Packstations.

The patent application EP3511886A1 by Deutsche Post AG describes a delivery vehicle with a shipment memory for receiving, storing, and reproducing shipments, with a transfer device for transferring shipments from the shipment memory to a shifting device and with a control device for controlling at least the displacement device, wherein the displacement device for delivering consignments at a location outside the delivery vehicle by moving the consignments and a retracted Position is formed in an extended position and back adjustable and wherein the displacement device for delivering consignments at different height levels outside the delivery vehicle is designed adjustable in height.

The U.S. Pat. No. 9,598,238B2 by UPS discloses automated loading and unloading items: computer program products, methods, systems, apparatus, and computing entities thereof. In various embodiments, items are received at a loading station where identification data may be captured for each item and handling instructions may be generated. In some embodiments, a label having indicia associated with the item may be generated and affixed to the item. The items may then be deposited through an access door into the vehicle identified in the handling instructions. Once the items are loaded into the access door, an automated load/unload device may deposit the item in the appropriate storage location. The automated load/unload device may also retrieve and rearrange items as desired.

One more U.S. Pat. No. 10,780,814B2 describes a method for delivery and/or collection of at least one mailing. To reduce the associated cost and effort a vehicle is driven to at least one receptacle through public traffic at least in part and at least one mailing to be delivered is taken from the vehicle and placed into the receptacle by a transfer device attached to the vehicle) and/or at least one mailing to be collected is brought from the receptacle to the vehicle by the transfer device attached to the vehicle.

One more EP patent application EP3254893A1 by Deutsche Post AG discloses a delivery vehicle for delivering items at different locations of a delivery route, comprising at least one receiving device for receiving the items, with at least one sensor device for separately detecting delivery information the consignments received via the receiving device, with at least one bearing device for storing the recorded programs during the delivery of other programs and with at least one conveying device for conveying the recorded items from the receiving device to storage positions of the bearing device and from the storage positions of the bearing device to a dispenser for dispensing the consignments at the respective place of delivery of the consignments.

Transfer over long distances is carried out by a chain of movements over shorter distances, which makes it possible to effectively use electric transport. The EP patent application EP3670007A1 discloses a method for determining a state of a sorting installation, functional unit, and sorting installation. The PCT application WO2018196574A1 discloses an automated storage and retrieval system of warehouse custody for mails, packages, and single-piece items, which can be used as a delivery chain member/station, for routed delivery among many intermediate points of the delivery chain. For example, in 2016, Cargo Sous Terrain presented a feasibility study for an underground cargo system https://spectrum.ieee.org/cars-that-think/transportation/infrastructure/swiss-considering-34-billion-cargo-tunnel-for-automated-delivery-trucks which would require large investments and dedicated underground traffic infrastructure.

Ecological objectives of postal parcel delivery services are being solved in most solutions and patents where electric and automated means are employed to avoid the use of fossil fuels and to reduce pollution of the environment. A radical approach of the aforementioned concept is projected to underground cargo delivery networks, presented in 2016, by Cargo Sous Terrain.

The relevant objective of delivery services is a high speed, continuity of operation, and availability of services where the systems work and services are provided 24/7. Speed of movement and delivery depends on the schedule day and night. Nighttime and less traffic-congested day hours can be efficiently used for delivery. Meanwhile, during traffic congestion hours, it is more complicated to achieve efficient and fast delivery. Delivery optimization with an optimal network of intermediate stores and optimal-length hops between them may be a solution. Further, a radical approach can be assumed to the aforementioned concept of underground cargo delivery networks, presented in 2016, by Cargo Sous Terrain. A significant increase in the availability of postal services through the creation of a network of postal terminals. These objective and solution examples are, at least, in WO2020063120A1 where postal businesses are mentioned to provide as many as needed terminal nearby houses, quarters, etc, or DHL Packstation which is a postal terminal installed in public places, or CN207851985U disclosing intelligence self-carry cabinet and unmanned delivering system.

Further, highly intensive postal and parcel delivery services may require the delivery terminals to be located "at the doorstep", to carry out automatic reception, identification, and delivery of parcels and correspondence. An example of such a close postal terminal may be disclosed in PCT application WO2020063120A1, where delivery of postal items and parcels to the terminal is done by air drones. The patent documents, relevant to this objective, can be EP3511886A1, CN207851985U, US20150321595A1.

Automatic reception, identification, and delivery of parcels and correspondence can be found at least in these patent documents:

WO2020063120A1, disclosing a self-"service parcel cabinet which transfers the parcel delivered by the drone to the corresponding self-service parcel locker and facilitates the implementation of the automation of parcel delivery";

the US patent application US20180362187A1 disclosing a method for Loading and/or Unloading an unmanned Transport Device at a Receiving Container;

EP patent application EP3511886A1, disclosing a delivery vehicle for delivering a shipping box with shipment and shipping box for receiving, storing, and returning shipments;

The US patent US999068462, disclosing a mail port for automated parcel carriers (receipt only), The U.S. Pat. No. 10,647,508B2, disclosing a storage station for storing containers transported by unmanned vehicles (receipt only), The Chinese utility model CN207851985U, disclosing an intelligence self-carry cabinet and unmanned delivering system, The US patent application US20100026452A1, disclosing the Deposit box unit, logistics system, and method for operating the deposit box unit. An exemplary deposit box facility comprises an audio playback device and a processor that is adapted to process audio data played back by the audio playback device. The processor may also be adapted to identify an object present in the deposit box facility based on the information acquired from the audio data, i.e., contactless.

Allocating the intermediate storage of parcels (warehouse) under the ground, to save aboveground space is disclosed is mentioned at least in these documents U.S. Ser. No. 10/647,508B2—"Storage station for storing containers transported by unmanned vehicles": "It will be appreciated that a storage station according to the present invention may be constructed as a grounded structure, or may be supported on another foundation or structure as needed." Underground storage implementation, only for receiving, is disclosed in the PCT application WO2020020454A1 "Receiving arrangement for receiving shipments, for use in openings in buildings".

The closest solution is described in WO2017191695A1 (also counterpart patents J P643891162, EP3287400B1, EP3508444B1, U.S. Pat. No. 10,503,164B2, CN107835776A), presenting a delivery system that enables efficient delivery of a package. This delivery system comprises a delivery vehicle that can be loaded with a delivery box to be delivered to a delivery destination; and a parent vehicle that can carry the delivery vehicle and has a storage area capable of storing one or a plurality of the delivery boxes. The parent vehicle includes a conveyance control mechanism that controls the conveyance of the delivery box placed in a prescribed storage position within the storage area to another storage position different from the prescribed storage position. The delivery vehicle includes a loading control mechanism that controls the reception and loading of the delivery box from the parent vehicle, the delivery box having been conveyed by the conveyance control mechanism to a receiving storage position, which is one among the storage positions, from which the delivery box can be received. The delivery box, which is loaded onto the delivery vehicle as a result of having been conveyed by the conveyance control mechanism to the receiving storage position and loaded by the loading control mechanism, is delivered to the delivery destination.

The problem identified by the present invention is to be improved the effectiveness and efficiency of postal and parcel end-point terminals. A solution is presented by this invention, for more efficient, preferably, fully automatic, postal and parcel delivery services, especially, in densely populated urban areas.

SUMMARY OF INVENTION

This invention discloses, primarily, an automated postal logistic module (APLM) device performing functions of a postal and parcel delivery, and comprising automated robotic means, enclosed and arranged within it. Such APLM device can be incorporated into logistic networks, for postal and parcel delivery, whereby, it is designed to be placed or installed in dense urban environments, and close proximities of end-consumers. The APLM comprises a robotic warehouse module and a module for receiving/delivering items. All delivered postal items come into, are stored, and are delivered out in closable containers (preferably, thermally insulated) which are involved as mechanical and format supports for the postal items being delivered. In the present invention, these containers are called parcelboxes. Moving parcelboxes in the warehouse (loading, unloading, placing onto shelves, and taking off-shelves, re-arranging, etc) are performed by warehouse robots. APLMs can be configured and operable either as:

Automated Postal Access Point (APAP) accessed by users of postal delivery services;

Automated Postal Network Node (APNN) purposed for delivery between other APLMs and temporal storage (corresponding to intermediate postal warehouses on the itinerary of delivery);

Automated Cargo Compartments on postal delivery Vehicles (ACCV), for transporting parcelboxes between APAPs and APNNs.

The purpose of APAPs is reception and delivery of mails and parcels, provision of points-of-sales for postal accessories and other goods, for end-customers. APAPs may also serve as temporary storage for parcelboxes, before reception by end customers. Preferably, APAPs are installed nearby permanent or predominant locations of consumers of delivery services: urban and country residential areas, administrative, office and urban areas, commercial centers, apartment buildings, recreational areas of car parks on highways, industrial complexes. It is considered to allocate multiple APAPs by a reasonably dense network, where the APAP devices are spread, preferably, uniformly.

APNNs serve exclusively as temporary postal storage locations in the postal network, i.e., intermediate warehouse nodes. APAPs and APNNs, preferably, are implemented underground, to save the location areas as much as possible. Nevertheless, APAPs and APNNs may also be placed on the ground surface, or inserted into buildings' niches, with their external ports accessible for loading-in and unloading-out parcelboxes. Meanwhile, ACCVs are purposed and arranged as automated postal logistic modules for transportation, which are mounted on a variety of postal vehicles, and driven on public roads.

APLMs (i.e., all configurations thereof: APAPs, APNNs, ACCVs), specifically, comprise their external ports and robotic equipment for automated interchanging of parcelboxes between APLMs, enabling to implement of postal delivery networks where parcelboxes can be transferred over such postal network in a fully automatic manner. Networks of APLMs can be operated as independent postal delivery networks, as well, as integrated with other postal services and courier services of e-commerce companies.

The APLM internal robots are retrievable from the warehouse, for replacement or maintenance. To retrieve the robots, it is not required to access internally into the warehouse but self-retrieval to the outside is done by the warehouse robot itself. After retrieving parcelboxes and robot mechanisms from the warehouse, only shelves with rails and elements of mechanical mounting remain in the APLM warehouse. When the APLM warehouse stays empty, then automated cleaning and disinfection can be performed. Cleaning is performed, preferably, by automated Clean-In-Place (CIP) methods. Before the CIP procedure, the preparatory operations are done: 1) the parcelboxes are retrieved from the shelves of the warehouse 2) the warehouse internal robots are retrieved; 3) if necessary, the transport elevator or its elements are retrieved out of the APLM warehouse. Afterward, a CIP washer with high-pressure atomizers, a pipe for collecting the used detergent, and a pipe supplying dry air are lowered down into the warehouse, through the transport elevator opening. The slopes of the warehouse floor are implemented in the way that the detergent/disinfectant liquid flows into a special recess in the floor, from where it is collected through the pipe for suction of the CIP system. When cleaning is finished, the CIP system further supplies dry air through the pipe for automatic drying. After the drying step, the warehouse robots are re-installed and restarted to work again.

Networks of APLMs are controlled by an IT system and software-implemented methods, connecting all APLMs into an integral controlled postal network and ensuring mutual operation of APLMs for automatic postal delivery services. Further, each APLM in the network has its autonomous control system, external communications, and autonomous power supply for operational independence of the postal network from local mains networks and telecommunication lines.

The present invention is characterized by a set of the following features:

construction and functionality of an automated postal logistic module (APLM) comprising a warehouse for storing parcelboxes, and robotic equipment for automated and fully automatic interchanging of parcelboxes between two such APLMs, or loading in parcelboxes and unloading from a single APLM;

preferably, vertical format (for space-saving) of the APLM, allowing to install of stationary APLMs (APAPs, APNNs) underground/underfloor (in occupied spaces, nearby users of postal services);

robotic technology and operation for moving parcelboxes from the delivery point to the destination in an automatic manner. The technology involves human interaction only at the delivery and receiving postal items at APLMs (APAPs) thus eliminating direct contacts of the sender and the recipient with other people. Contacts of the delivered postal items and parcelboxes with people, except the sender and the recipient, is eliminated too;

detachable and dismountable construction of all technical equipment inside the APLM: module for receiving/delivering, warehouse robots are designed to allow their retrieval from the warehouse module from the outside, for replacement and maintenance in a remote workshop, also, allowing to clean the APT warehouse automatically;

energetic independence of APLM from mains networks, where all APLM internal mechanisms are powered by the power source of autonomous power supply, recharging of which can be executed outside the APAP;

Applications of the invention involve, and are not limited to:

reception of parcels and correspondence by end-customers;

delivery of parcels, correspondence, magazines/newspapers between end-customers;

selling postal accessories, commodities, and other goods to customers, etc.

DESCRIPTION OF DRAWINGS

The drawings are provided as a reference to possible embodiments and are not intended to limit the scope of the invention. Neither of the drawings and the graphs presented herein should be construed as limiting the scope of the invention, but merely as an example of a possible embodiment.

FIG. 1A is a perspective view of an example of an Automated Postal Logistic Module (APLM), in which:

Figure 1A:
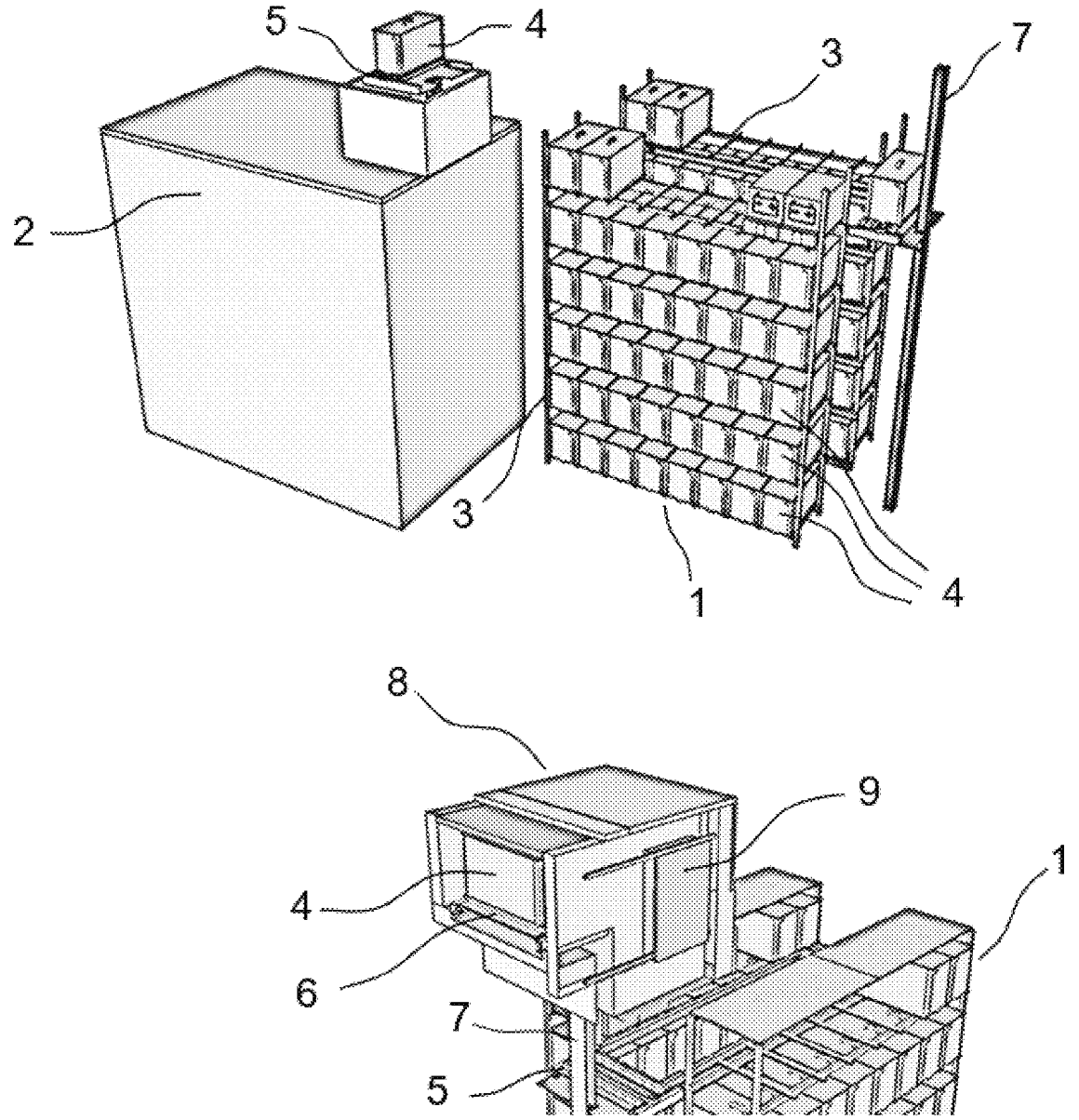

1—APLM with a warehouse module 2 having vertically-allocated underground implementation in a durable waterproof and, if necessary, thermally insulated housing, 3—shelf racking, 4—parcelboxes on the shelving, 5—warehouse robot for moving parcelboxes in the shelving, 6—user's place for loading and unloading postal items into and out parcelboxes, 7—robot-elevator for moving the warehouse robot 5 between shelving 3 floors and external port 8; 8—external port for loading/unloading the parcelboxes 4; 9—security door limiting access to the APLM.

Figure 1B:
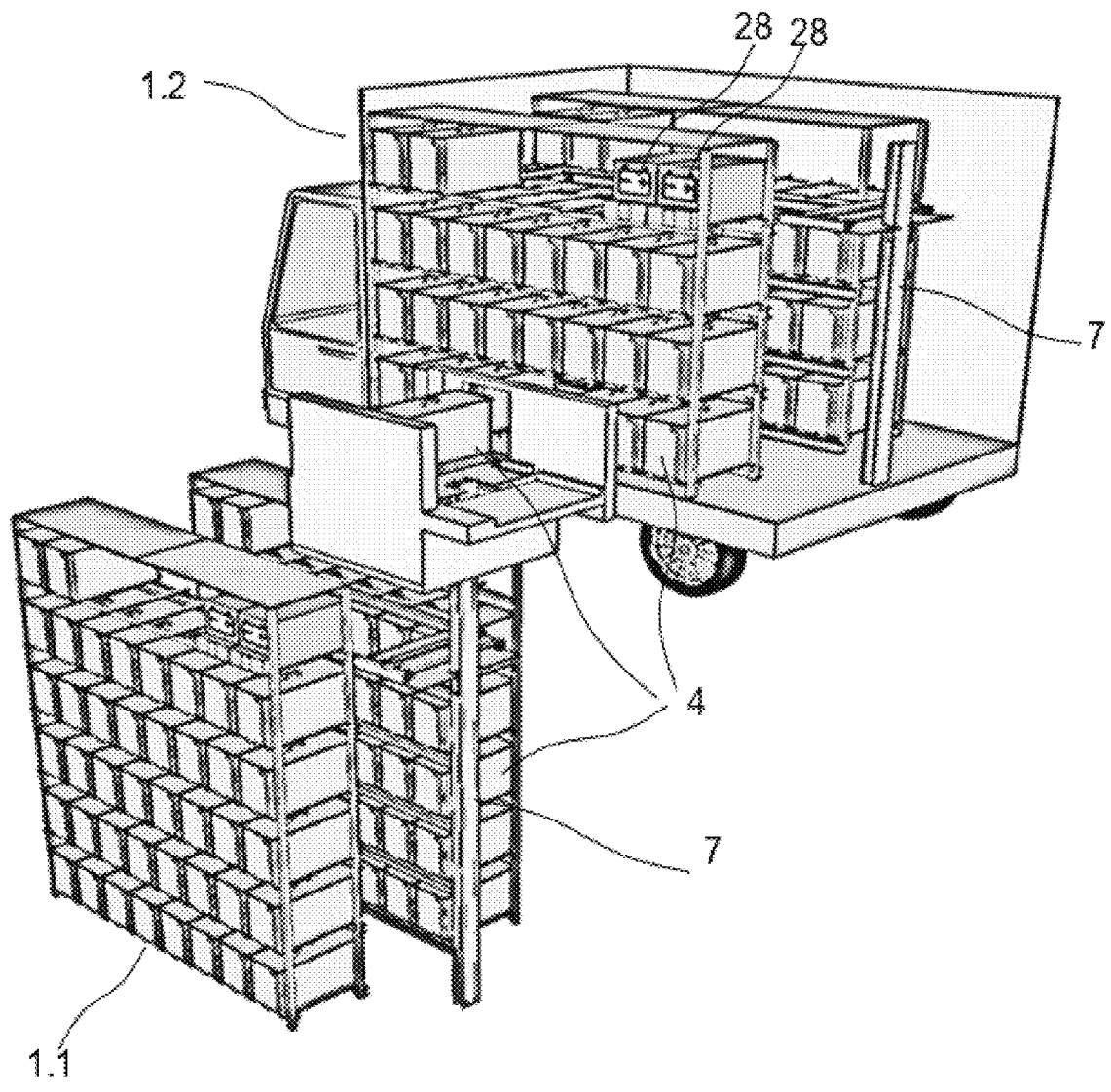
Figure 2A:
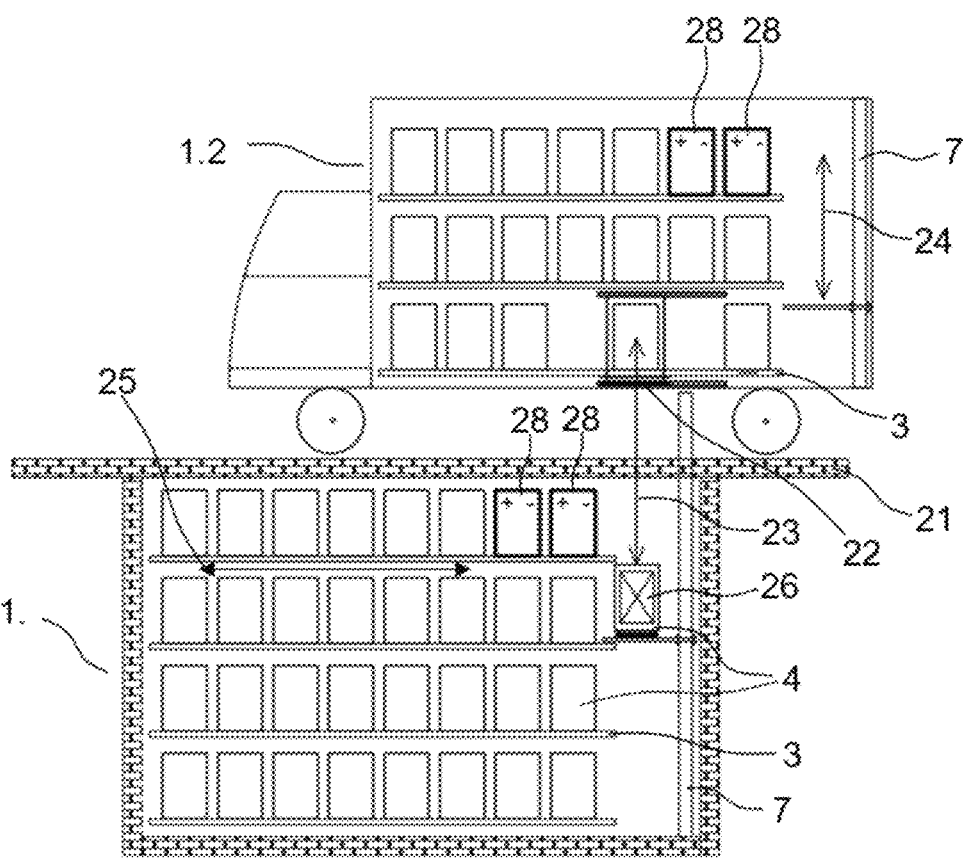
Figure 2B:
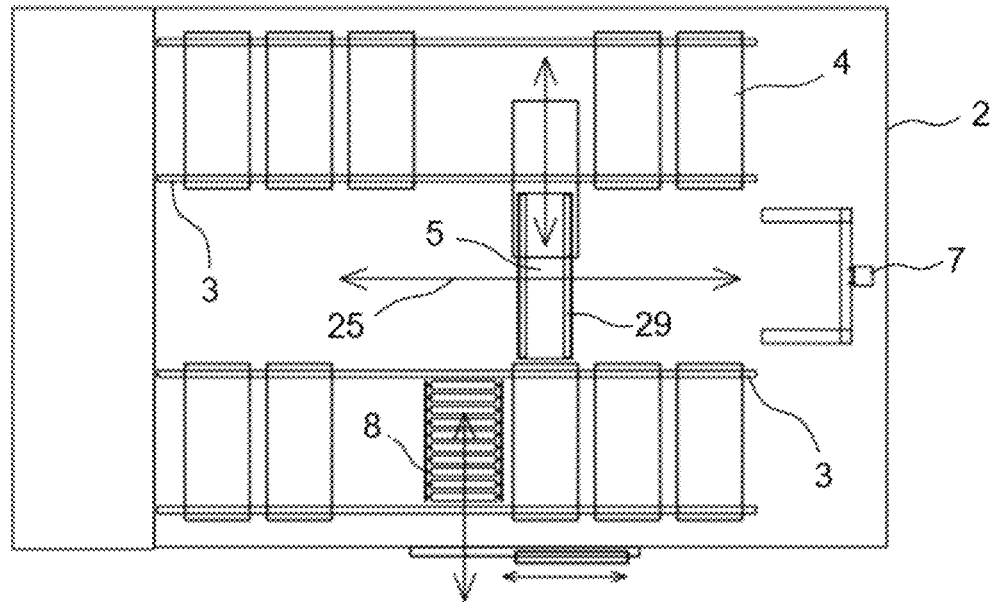

FIG. 1B is a perspective view of a postal shuttly transferring parcelboxes between the APAP and APNN FIG. 2A is a vertical cross-section (side view) of Automated Postal Access Point (APAP) or Automated Postal Network Node (APNN), including a view of the warehouse module 2 which is allocated underground in a rugged waterproof and, if necessary, thermally insulated housing, coupled to an Automated Cargo Compartment Vehicle (ACCV), where: 1.1—APAP, 1.2—ACCV; 3—warehouse shelving; 7—robot-elevator for moving the warehouse robot 5; 8—external port of the APAP for loading/unloading parcelboxes; 21—ground or floor surface; 22—tray of the warehouse robot for a parcelbox; 23—direction of moving the tray with a parcelbox in and out of the APAP warehouse; 24—direction of moving across shelving floors inside of the APLM warehouse; 25—direction of moving along shelves inside of the APAP warehouse; 26—a postal item in a parcelbox; 28—APAP's internal power supply battery in a parcelbox format;

FIG. 2B is a vertical cross-section (side view) of APAP or APNN, in which ACCV's warehouse 2 presented by a horizontal cross-section, where: 2—warehouse; 3—warehouse shelving; 4—parcelboxes; 8—external port in the warehouse for loading/unloading parcelboxes; 25—direction of moving along shelves inside the warehouse; 29—transversal rails of the warehouse robot for placing a parcelbox on the shelving.

Figure 3A:
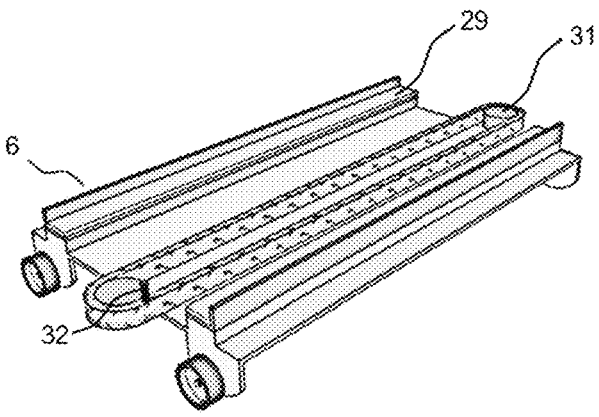
Figure 3B:
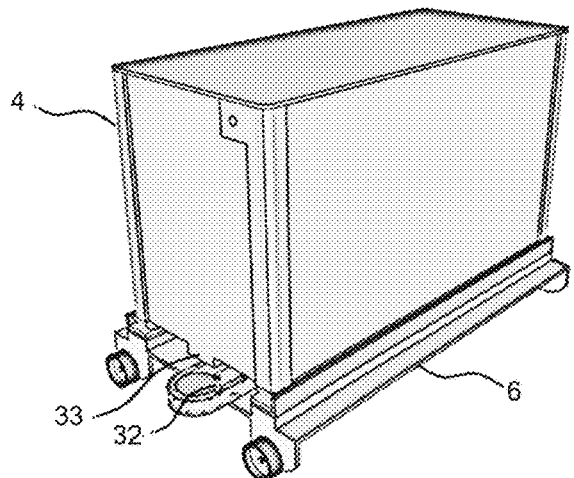
Figure 3C:
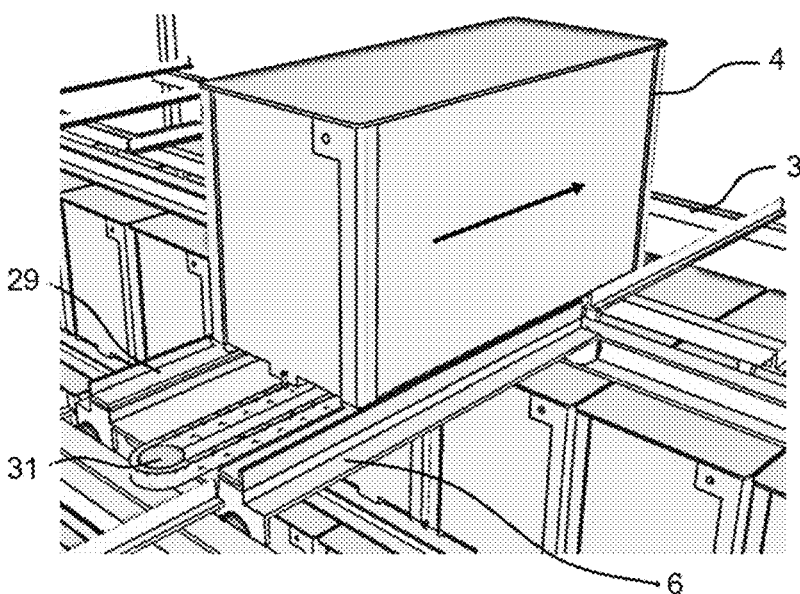
Figure 3D:
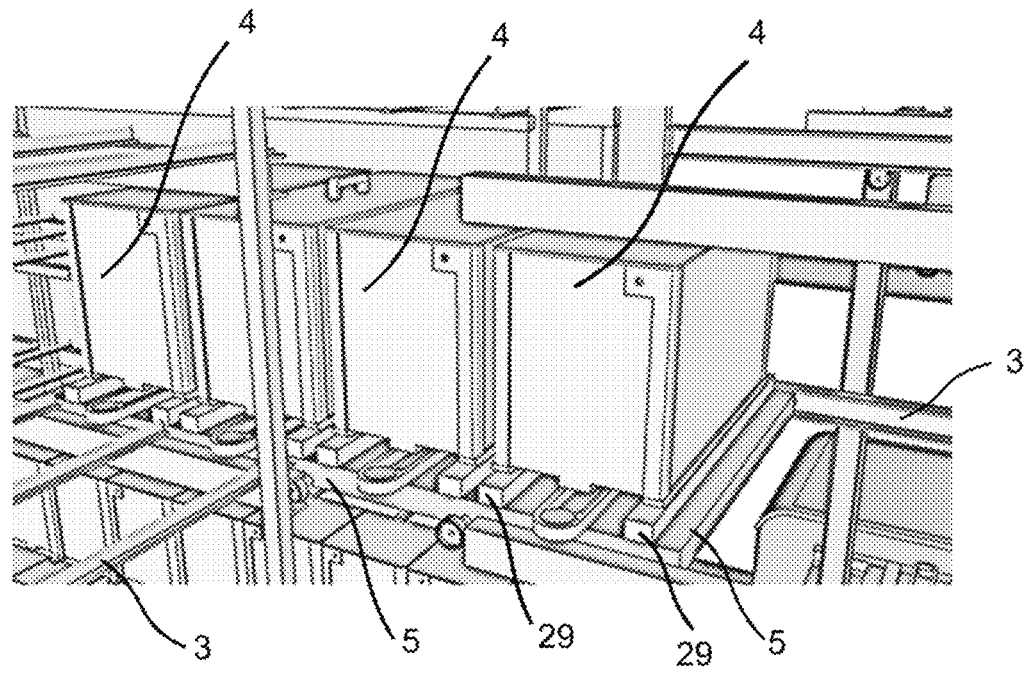
Figure 3E:
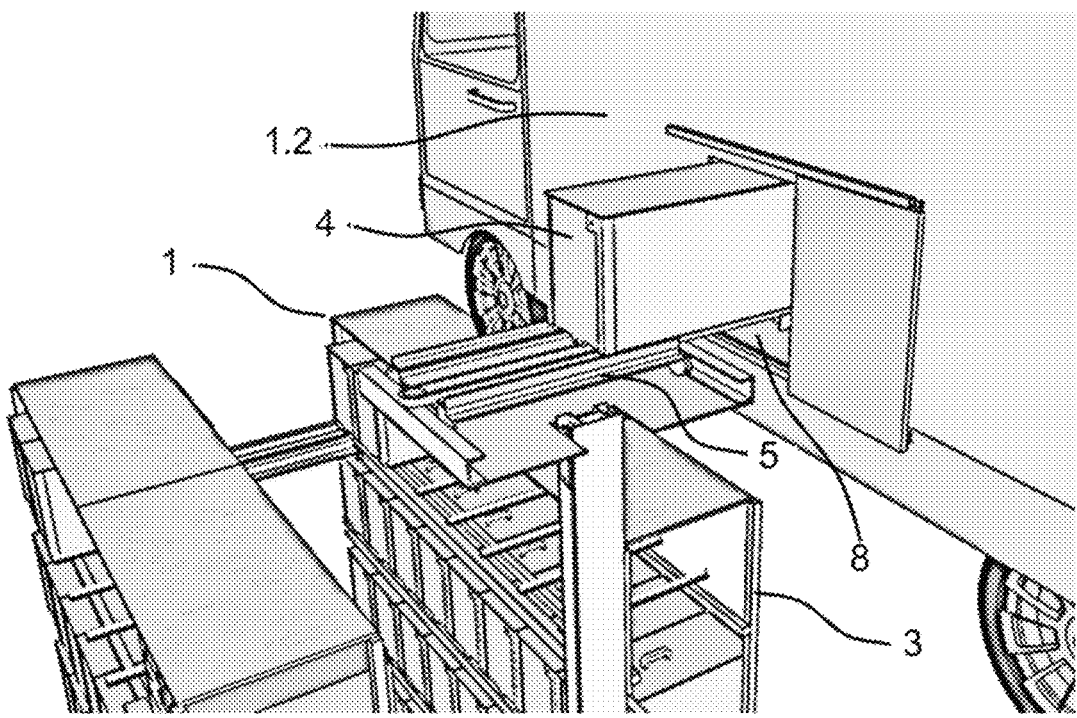

FIG. 3A is a view of APLM's warehouse internal robotic shuttle (vehicle), including robotic vehicle 5 with transversal rails 29, pushing mechanism 31 with pusher 32;

FIG. 3B is a view of APLM's warehouse internal robotic shuttle (vehicle), with a parcelbox 4 with push plate 33 mounted on the top of the vehicle 5;

FIG. 3C is a view of APLM's warehouse internal robotic shuttle (vehicle), including the robotic shuttle (vehicle) 5 positioning parcelbox 4 on the shelf 3;

FIG. 3D is a view of APLM's warehouse internal robotic shuttle (vehicle), including an example of the robotic shuttle (vehicle) 5 moving several parcelboxes 4 between the shelving 3 inside the warehouse 2;

FIG. 3E is a view of APLM's warehouse internal robotic shuttle (vehicle), including an example of the robotic shuttle (vehicle) 5 moving a parcelbox 4 between the warehouse shelving 3 and the external port 8 of the ACCV 1.2.

Figure 4:
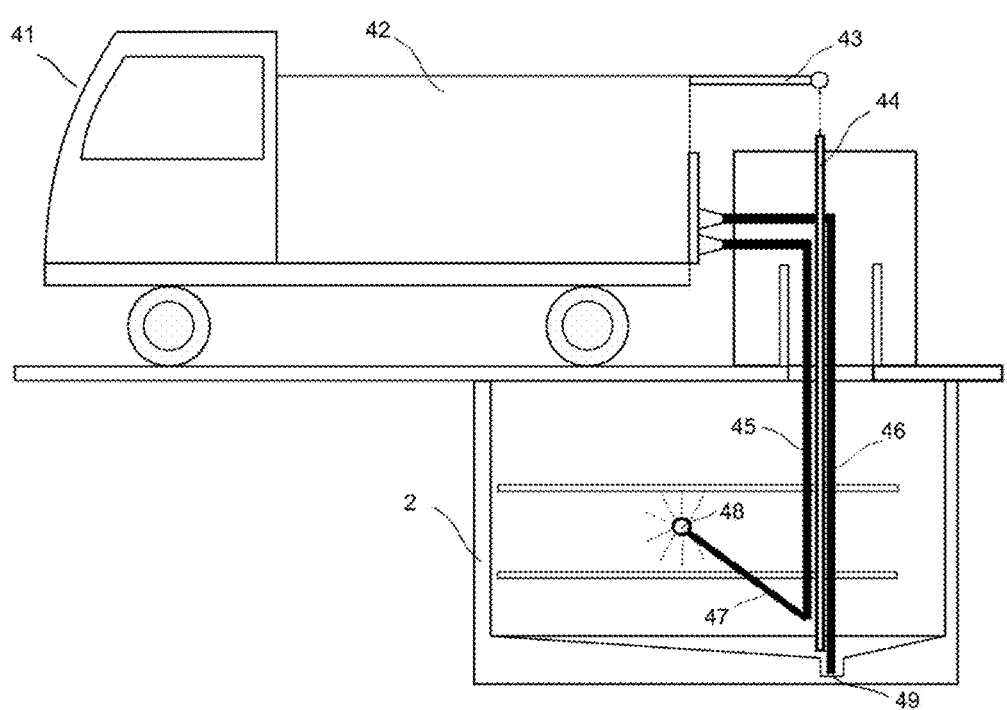

FIG. 4 Arrangement of CIP-cleaning service inside the APLM warehouse 2, where: 41—CIP-service vehicle with the equipment for CIP-cleaning, 42—capacity of CIP liquid; 43—mechanism of the supply of vertical supporting bar; 44—vertical supporting bar, 45—pipe for supplying the cleaning liquid under the pressure, 46—pipe for removing waste cleaning CIP liquid from the floor, 47—pivoted rod, 48—spray-ball with CIP liquid atomizers, 49—recess for collecting and removing the used CIP liquid.

Figure 5:
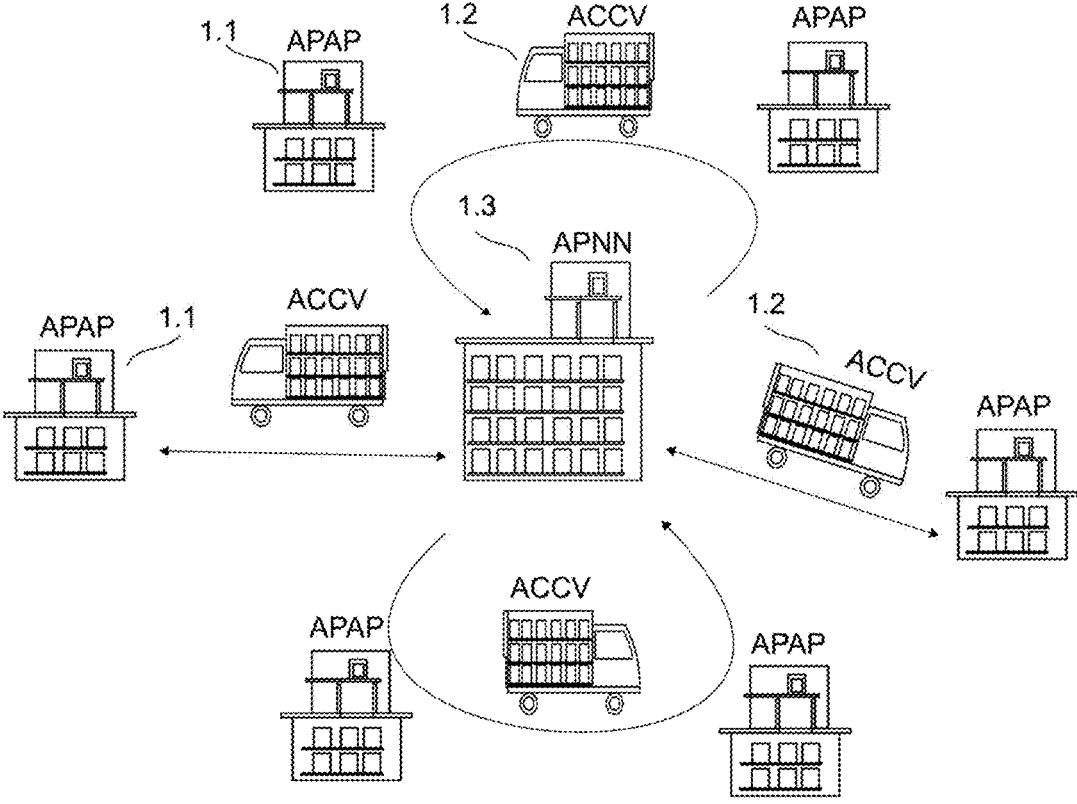
Figure 6:
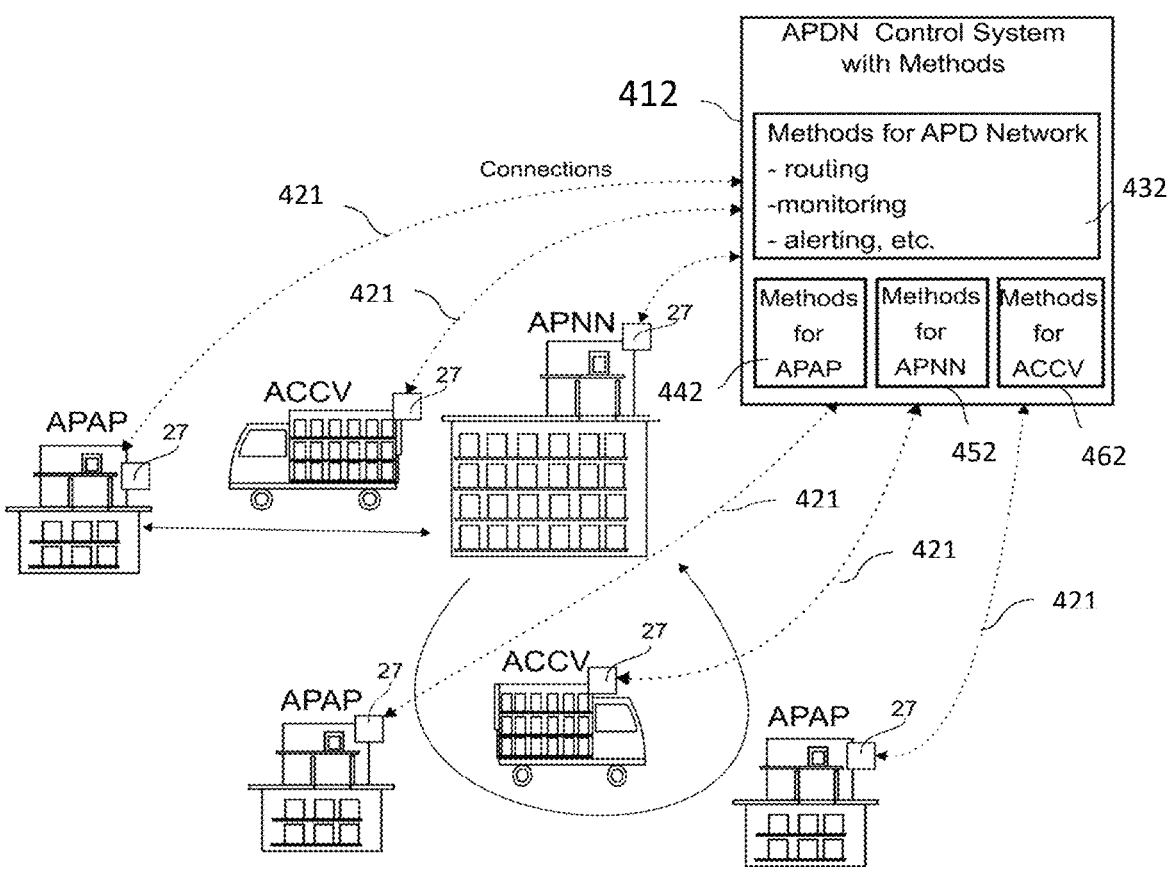

FIG. 5 Automated Postal Delivery Network (APDN) comprising different operational configurations of APLMs: 1.1—APAPs, 1.3—APNNs and 1.2—ACCVs—all interacting for delivery of parcelboxes 4 across the APDN between postal service users—senders and recipients;

FIG. 6 System and methods for controlling the Automated Postal Delivery Network (APDN), where: 27—APLM's internal control system; 412—ADPN control system infrastructure on physical, or virtual servers, or cloud servers; 421—communication lines with networked APLMs; 432-462—software-implemented control methods of APDN: 432—control methods of the ADPN network, 442—control methods for individual APAPs, 452—control methods for individual APNNs, 462—control methods for individual ACCVs.

Figure 7:
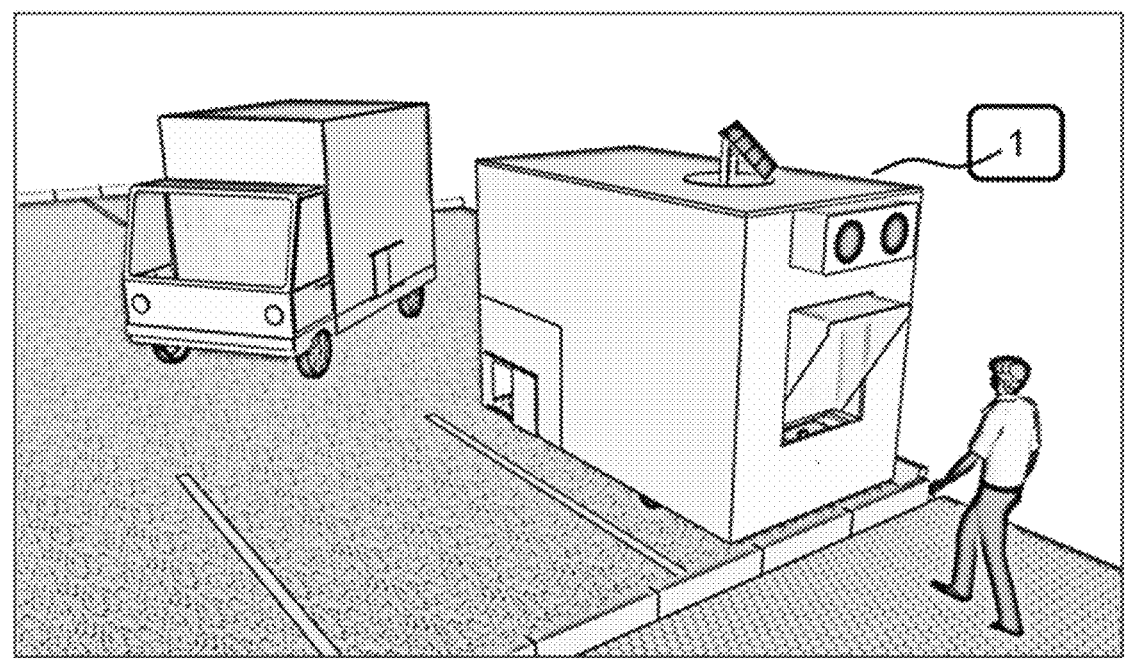

FIG. 7 An example of a mobile APLM being able to provide functions of APAP, APNN, and ACCV.

Figure 8A:
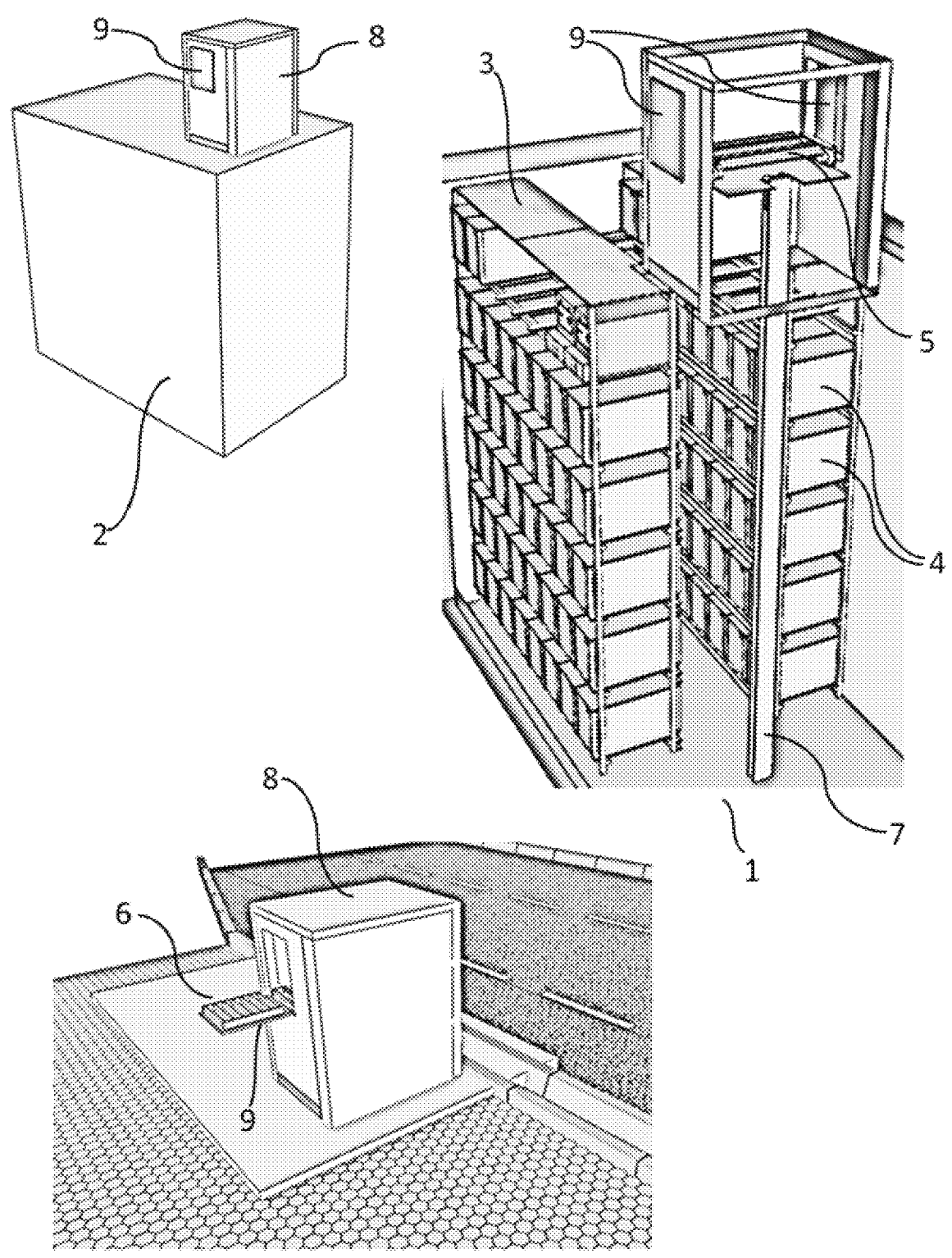

FIG. 8A illustrates an automated postal logistics module (APLM) comprising means of automated exchange of parcelboxes, including perspective views of the module and its internal arrangements.

Figure 8B:
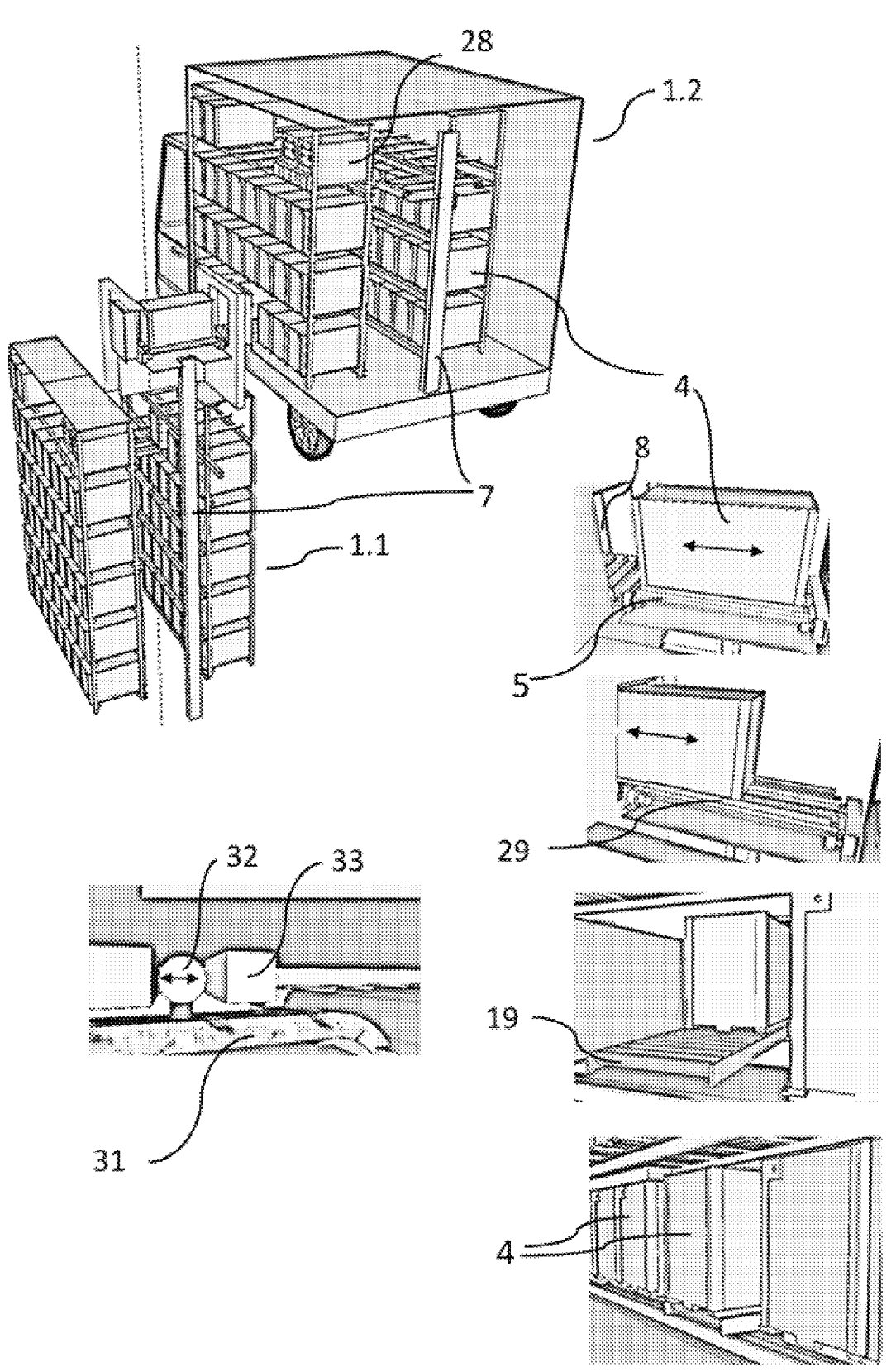
Figure 8C:
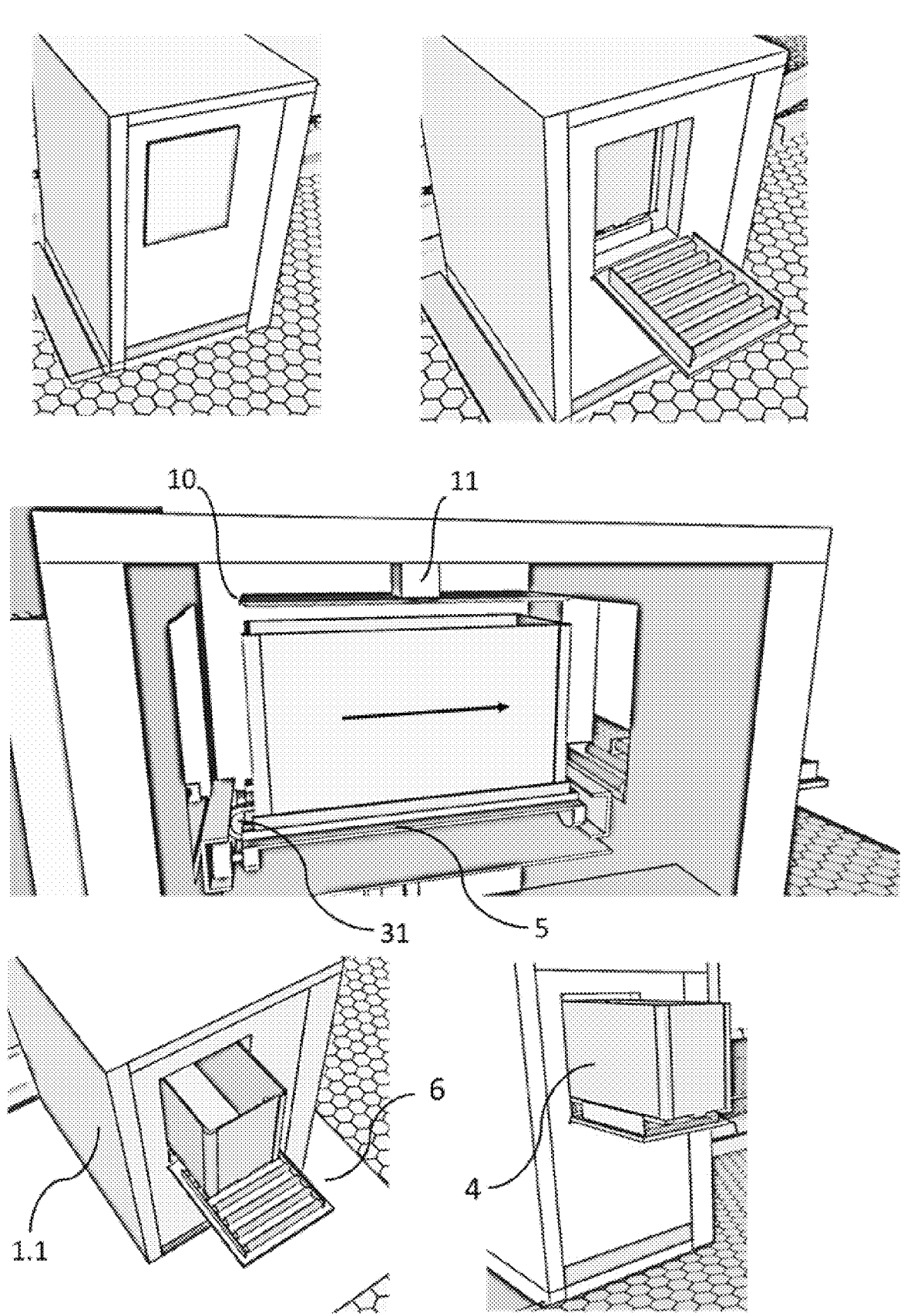
Figure 8D:
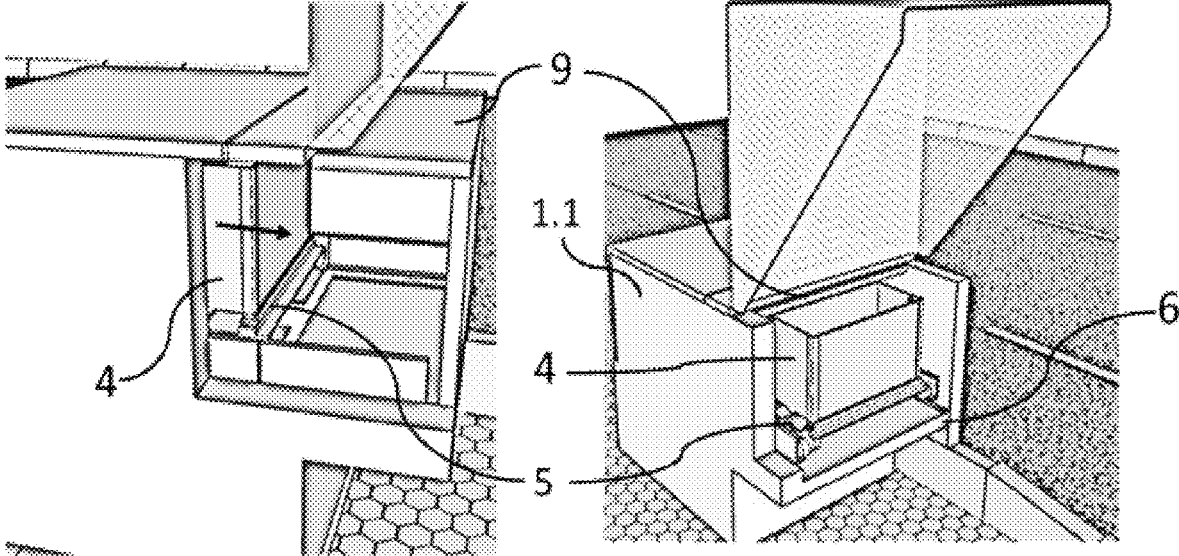

FIG. 8B illustrates an automated postal logistics module (APLM) comprising means of automated exchange of parcelboxes, including a perspective view of an ACCV 1.2 (a postal shuttle carrying postal items between stationary type APAP 1.1/APNN 1.3 modules) in the process of automatical transfer (reloading) of parcelboxes between the APAP module and ACCV shuttle;

FIGS. 8C and 8D illustrate an automated postal logistics module (APLM) comprising means of automated exchange of parcelboxes, including a perspective view of the APAP sliding a parcelbox 4 into the user's place 6 for loading and unloading postal items 26 for delivery; 10—a protective cover of the parcelbox 4; 11—a fixing element or latch (electromagnet) for fixing the parcelbox cover 10 in the process of its removal; 19—roller-conveyor of the external port 8 of the ACCV; 29—directing-guides of the warehouse shuttle 5 (which is a robot); 31—pushing mechanism of the warehouse shuttle 5; 32—pushing cam of the pushing mechanism 31; 33—U-shaped stop at the bottom of the parcelbox 4.

Figures 9A, 9B:
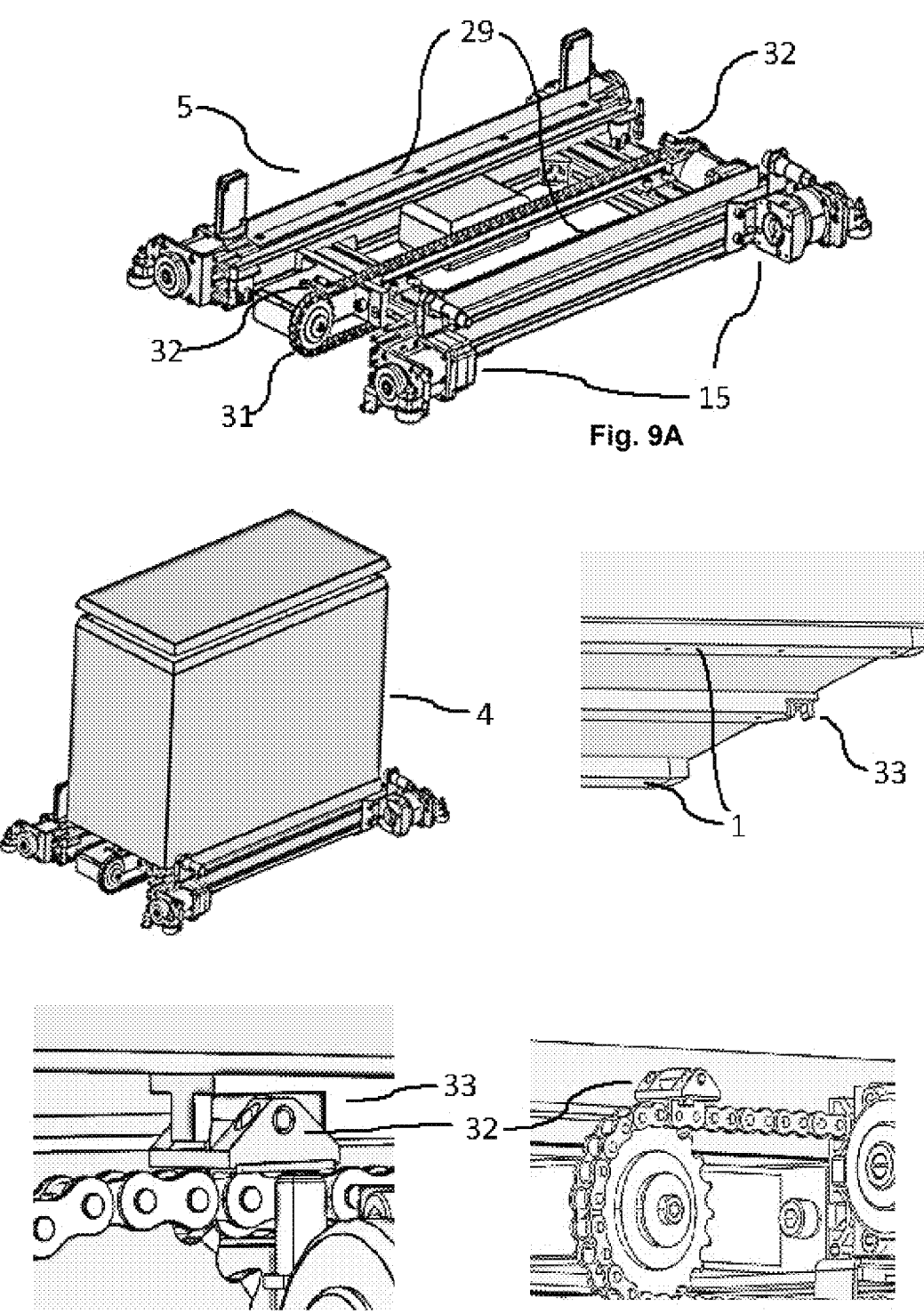

FIG. 9A is a view of the internal robotic shuttle of the APLM warehouse (vehicle for transferring parcelboxes within the warehouse, including the warehouse shuttle 5 with wheel drives 15, with transverse rails 29, a pusher mechanism 31, equipped with two pusher cams 32.

Figure 9C:
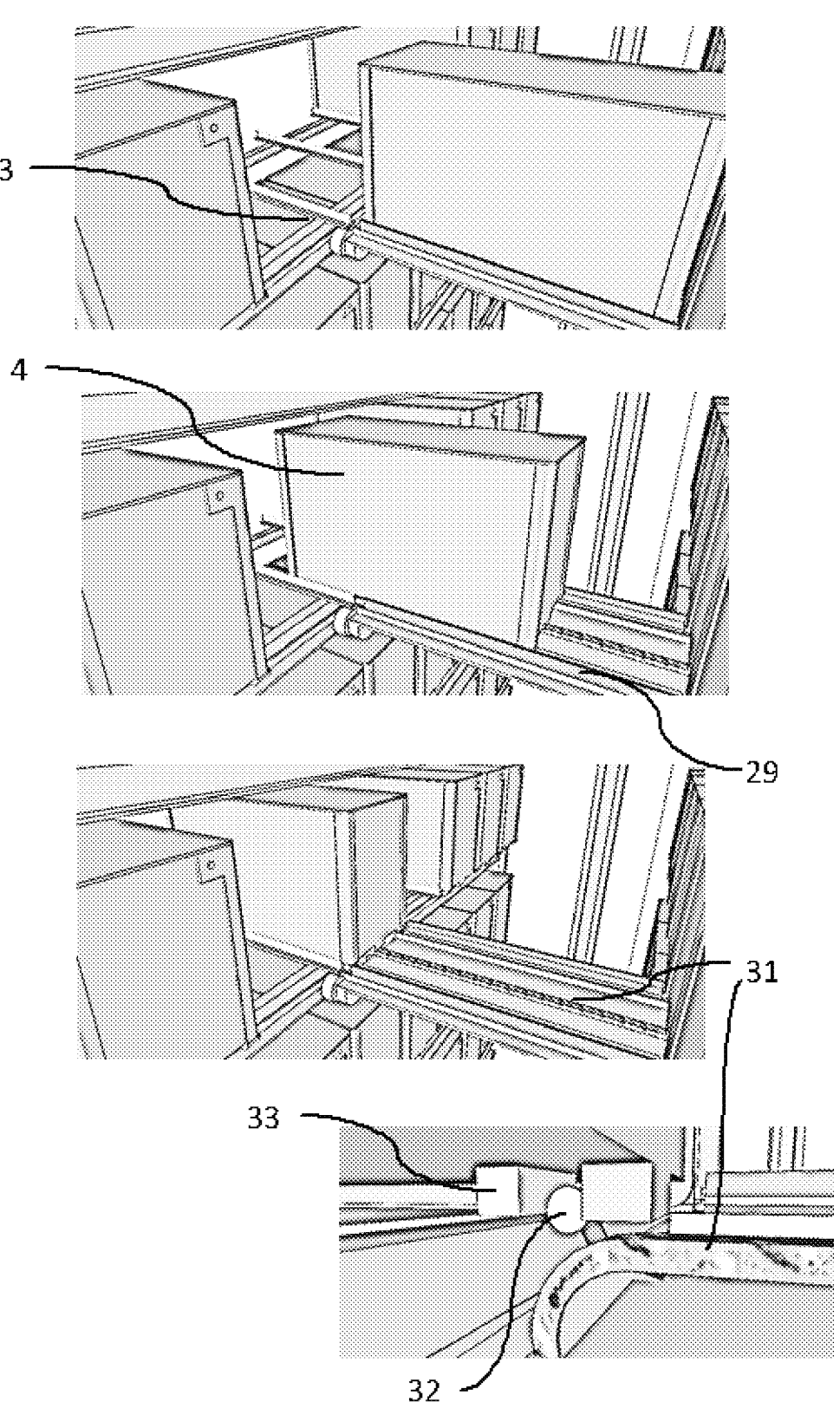
Figure 9D:
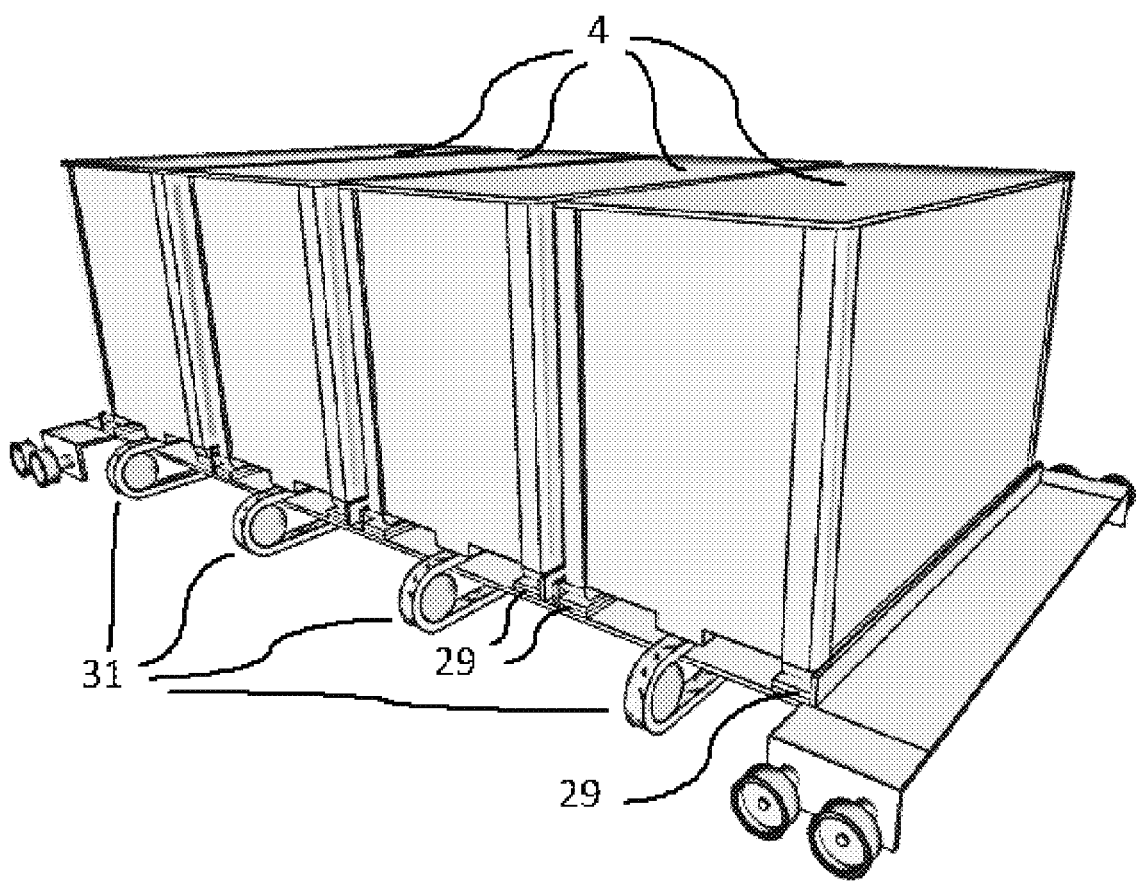

FIG. 9B is a view of the internal robotic shuttle of the APLM warehouse (vehicle for transferring parcelboxes within the warehouse, with a parcelbox 4 with sliding direction-guides 12 and a U-shaped stop 33 at the bottom of the parcelbox 4, which is then placed onto the top of the warehouse shuttle 5;

FIG. 9C is a view of the internal robotic shuttle of the APLM warehouse (vehicle for transferring parcelboxes within the warehouse, including the warehouse shuttle 5 while positioning a parcelbox 4 onto the warehouse shelving rack 3;

FIG. 9D is a view of the internal robotic shuttle of the APLM warehouse (vehicle for transferring parcelboxes within the warehouse, including a multi-seated warehouse shuttle 5 moving several parcelboxes 4 at a time.

Figures 10A, 10B:
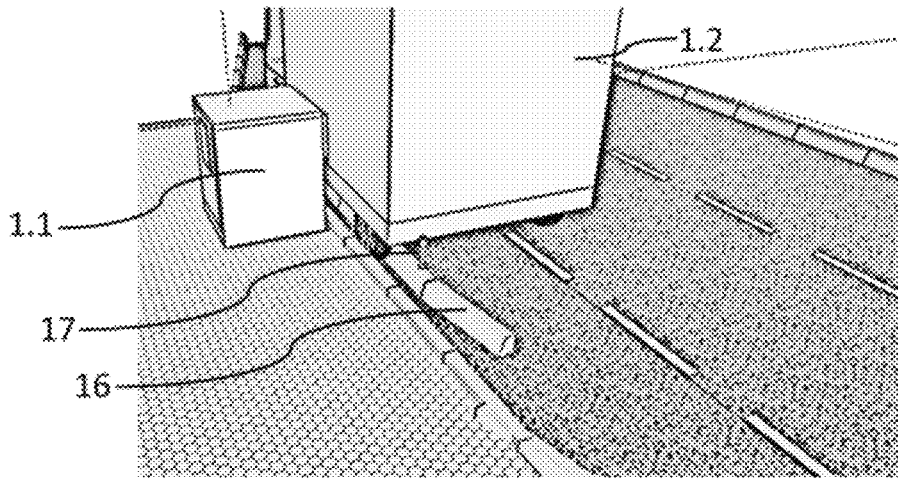

FIG. 10A illustrates an example of mechanical positioning of the postal vehicle ACCV 1.2 to stationary type APAP 1.1 or APNN 1.3 modules, in which ACCV 1.2 is positioned to the APAP 1.1.

FIG. 10B illustrates an example of mechanical positioning of the postal vehicle ACCV 1.2 to stationary type APAP 1.1 or APNN 1.3 modules, in which ACCV 1.2 is positioned to the APNN 1.3, including:

14—ultrasonic stop-position sensor, of the stop position;
   16—wheel-guides for positioning of the ACCV 1.2, for example, the wheel-guides made of stone or concrete;
   17—mechanical positioning jacks;
   18—mechanical support, having e.g. cone-shaped or sphere-shaped the upper surface.

FIG. 11A illustrates an example of placing a rail jumper-bridge between the warehouse racks 3 (rails thereof) of two interdocked APLMs, for automatic movement of parcelboxes between them, showing installing a jumper-bridge.

FIG. 11B illustrates an example of placing a rail jumper-bridge between the warehouse racks 3 (rails thereof) of two interdocked APLMs, for automatic movement of parcelboxes between them, showing jumper-bridge fixation;

FIG. 11C illustrates an example of placing a rail jumper-bridge between the warehouse racks 3 (rails thereof) of two interdocked APLMs, for automatic movement of parcelboxes between them, showing moving the warehouse shuttle 5 through the gap between the racks and the jumper-bridge; 3—warehouse racks; 4—parcelboxes; 5—warehouse robot; 34—drive of the jumper-bridge (it is a gear-motor controlled by the APNNs control system; it is fixed on warehouse racks 3, and the output shaft of the gearbox is connected to the jumper 35, and the jumper will be fixed on the shaft; the gear-motor is turned on and the jumper starts moving in the specified direction; control of the position of the jumper is carried out by following the information provided from the absolute encoder installed on the motor-reducer); 35—jumper-bridge; 36—lock: 37—locking cam; 38—a block of dual wheels of the warehouse shuttle; 39—direction of the jumper-bridge 35 rotation during installation thereof; 40—the direction of rotation of the drive shaft of the lock 36 in the process of its locking.

Figure 12A:
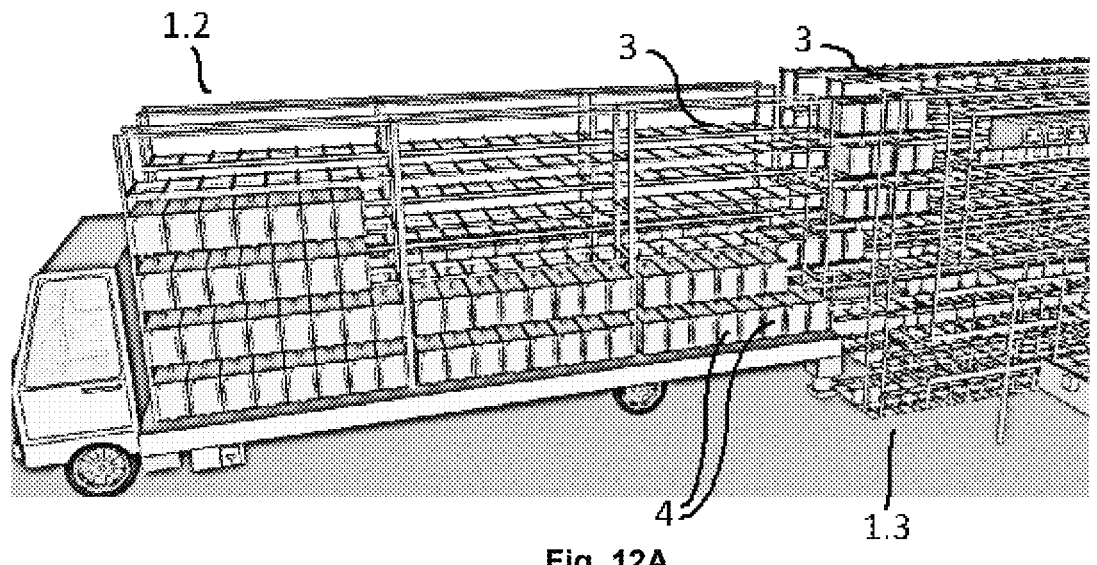

FIG. 12A illustrates an example of automated movement of parcelboxes between ACCV 1.2 shuttle and APNN 1.3 module, by placing special rail jumper-bridges at several levels of the warehouse racks 3 of ACCV to APPN, including a perspective view of the ACCV 1.2 and APNN 1.3 during the automatic transfer.

Figure 12B:
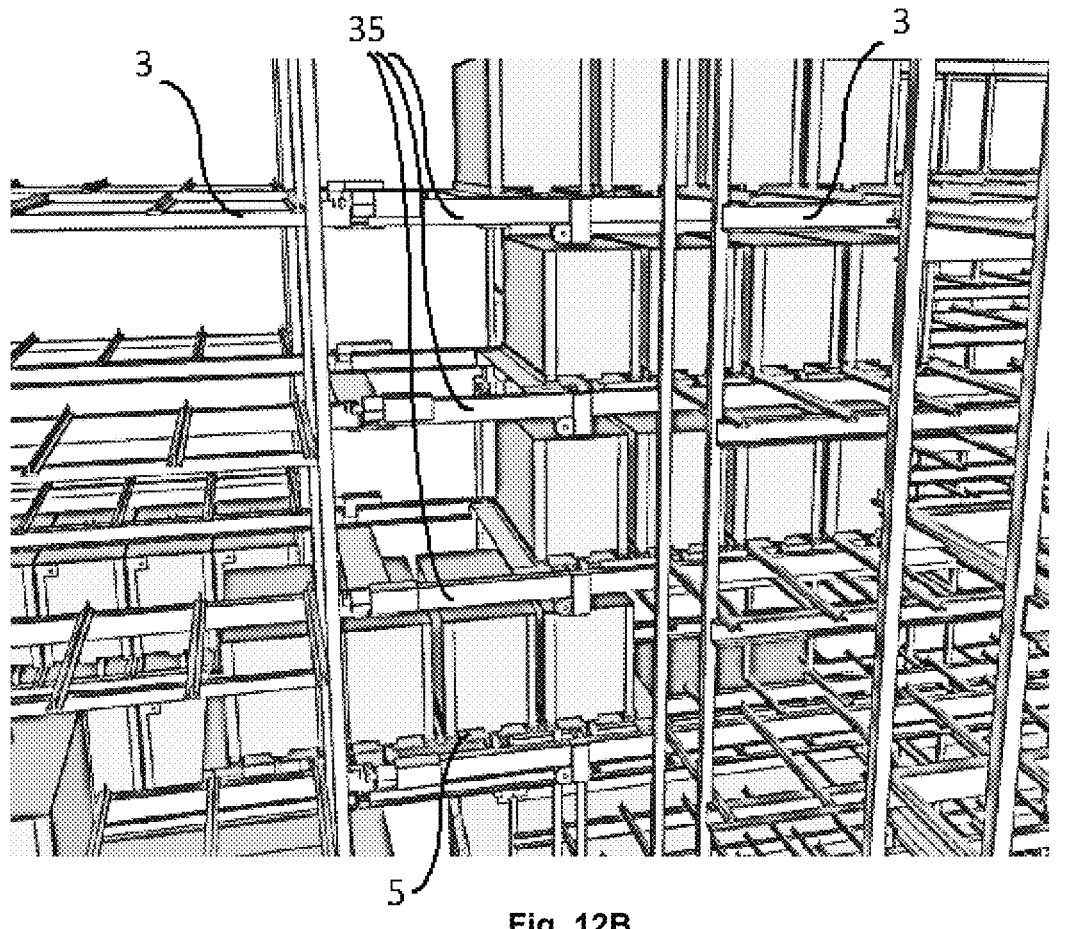
Figures 13A, 13B:
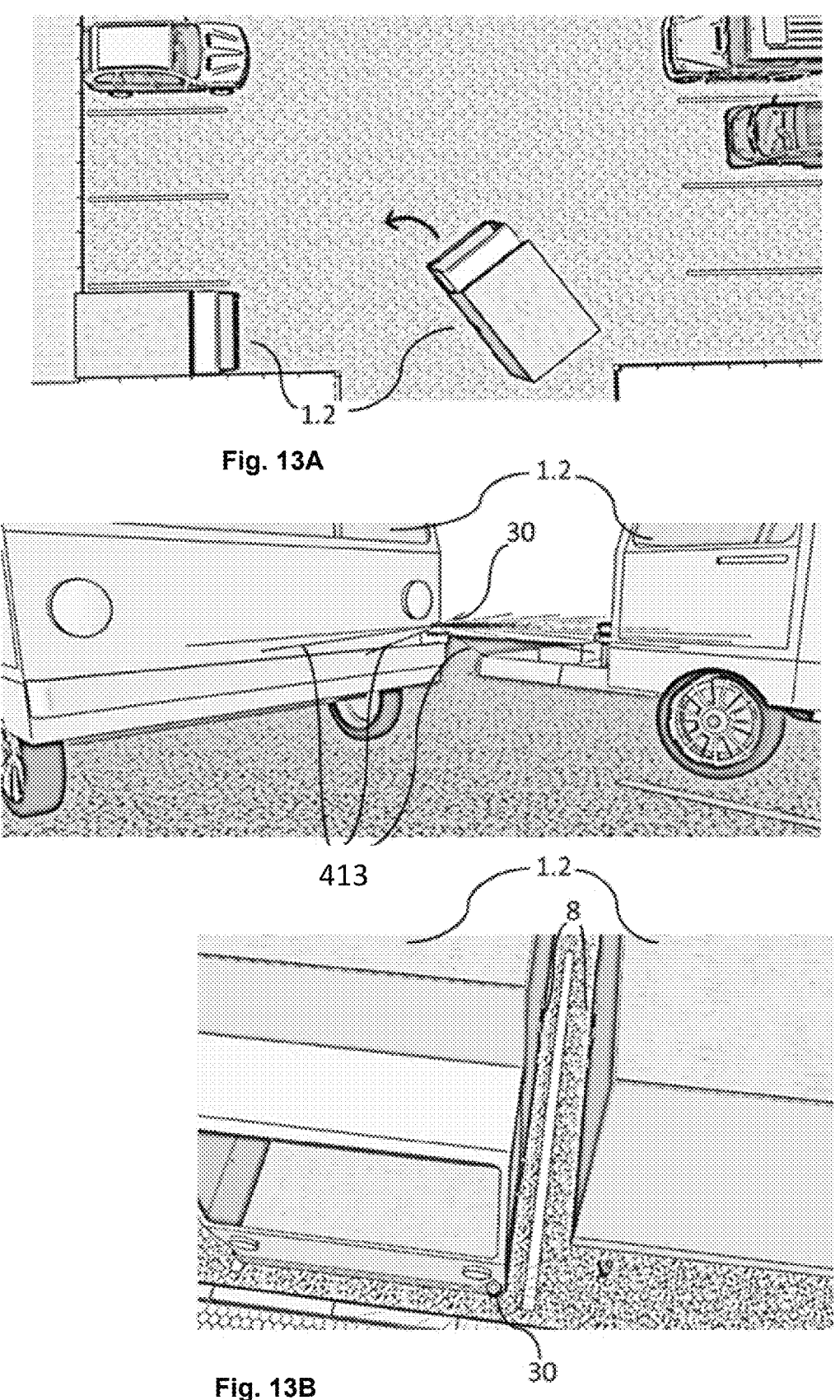

FIG. 12B illustrates an example of automated movement of parcelboxes between ACCV 1.2 shuttle and APNN 1.3 module, by placing special rail jumper-bridges at several levels of the warehouse racks 3 of ACCV to APPN, including fixed rail jumper-bridges on several levels of warehouse racks, in which 3—warehouse racks; 4—parcelboxes; 5—warehouse shuttle (internal robot); 35—rail jumper-bridges;

FIG. 13A illustrates implementation of automatic transfer (reloading) of parcelboxes 4 between two ACCVs 1.2, in which ACCV 1.2 is positioned to another ACCV 1.2.

FIG. 13B illustrates implementation of automatic transfer (reloading) of parcelboxes 4 between two ACCVs 1.2, in which ACCV 1.2 is positioned to another ACCV 1.2, in which 4—parcelbox; 8—ACCVs external port; 9—opened security door; 30—fan-shaped laser measuring sensor: 413—laser measuring beams.

Figure 14:
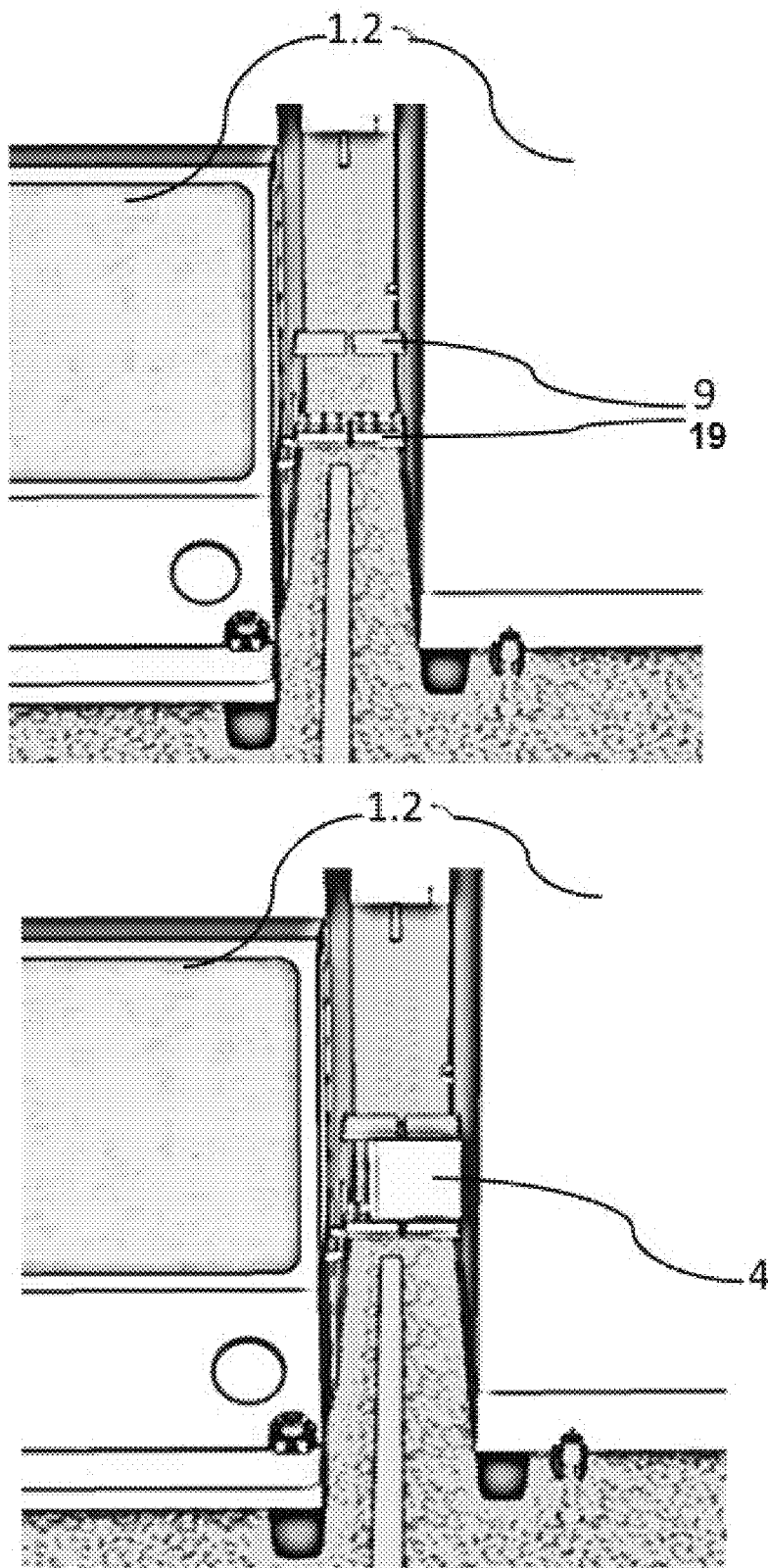

FIG. 14 Interdocked two ACCVs 1.2 for exchanging parcelboxes 4 between them, via the conveyor bridge 19 and openede security doors 9.

Figure 15:
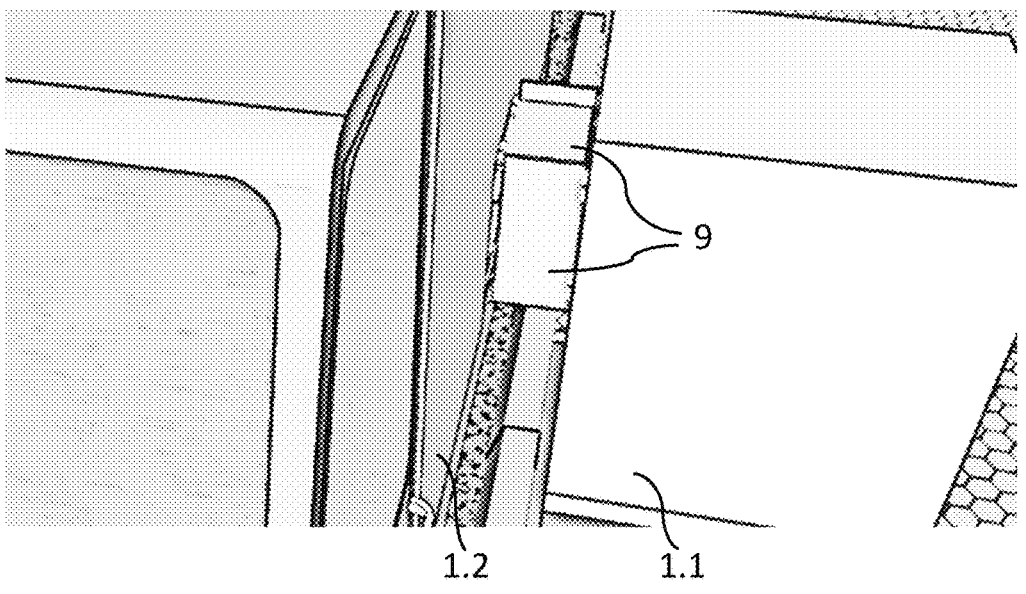
Figure 15:
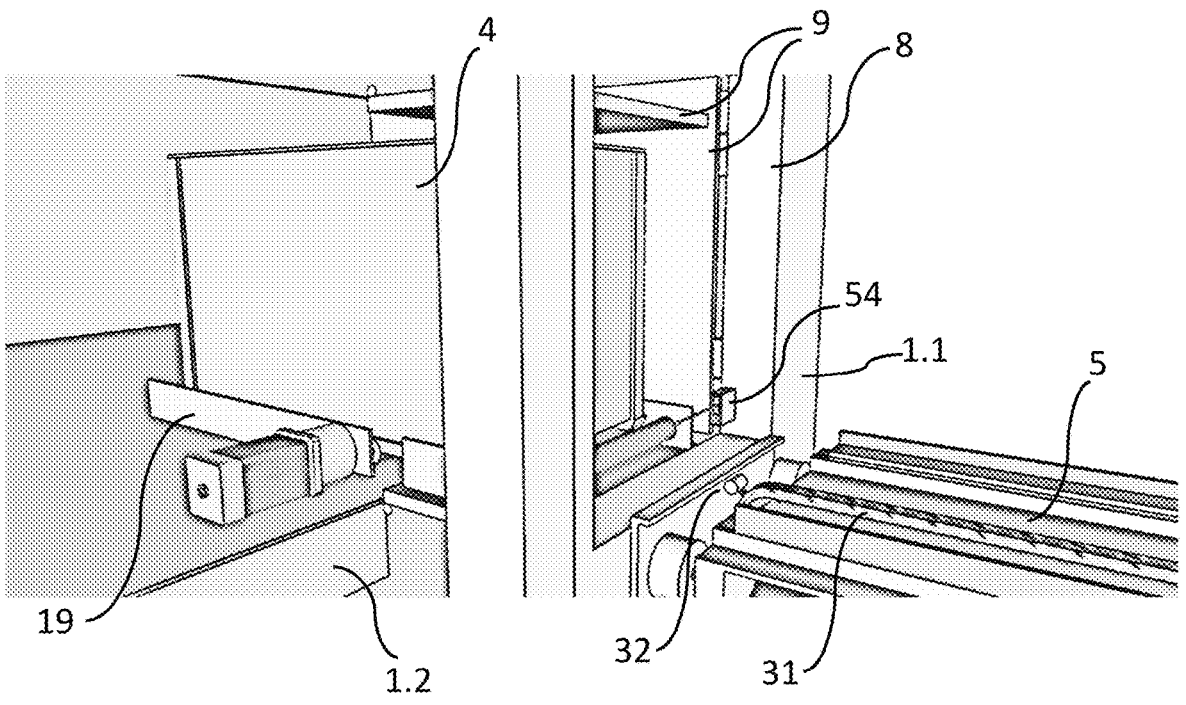

FIG. 15 Example of a conveyor-bridge for moving parcelboxes between ACCV 1.2 and APAP 1.1; 4—parcelbox; 5—warehouse robot; 9—security doors in the open state, forming a protective fence around the conveyor bridge; 19—conveyor bridge driven by a gear-motor, and guides for the parcelbox; 31—pushing mechanism; 32—pusher cam; 54—laser photosensor.

Figures 16A, 16B:
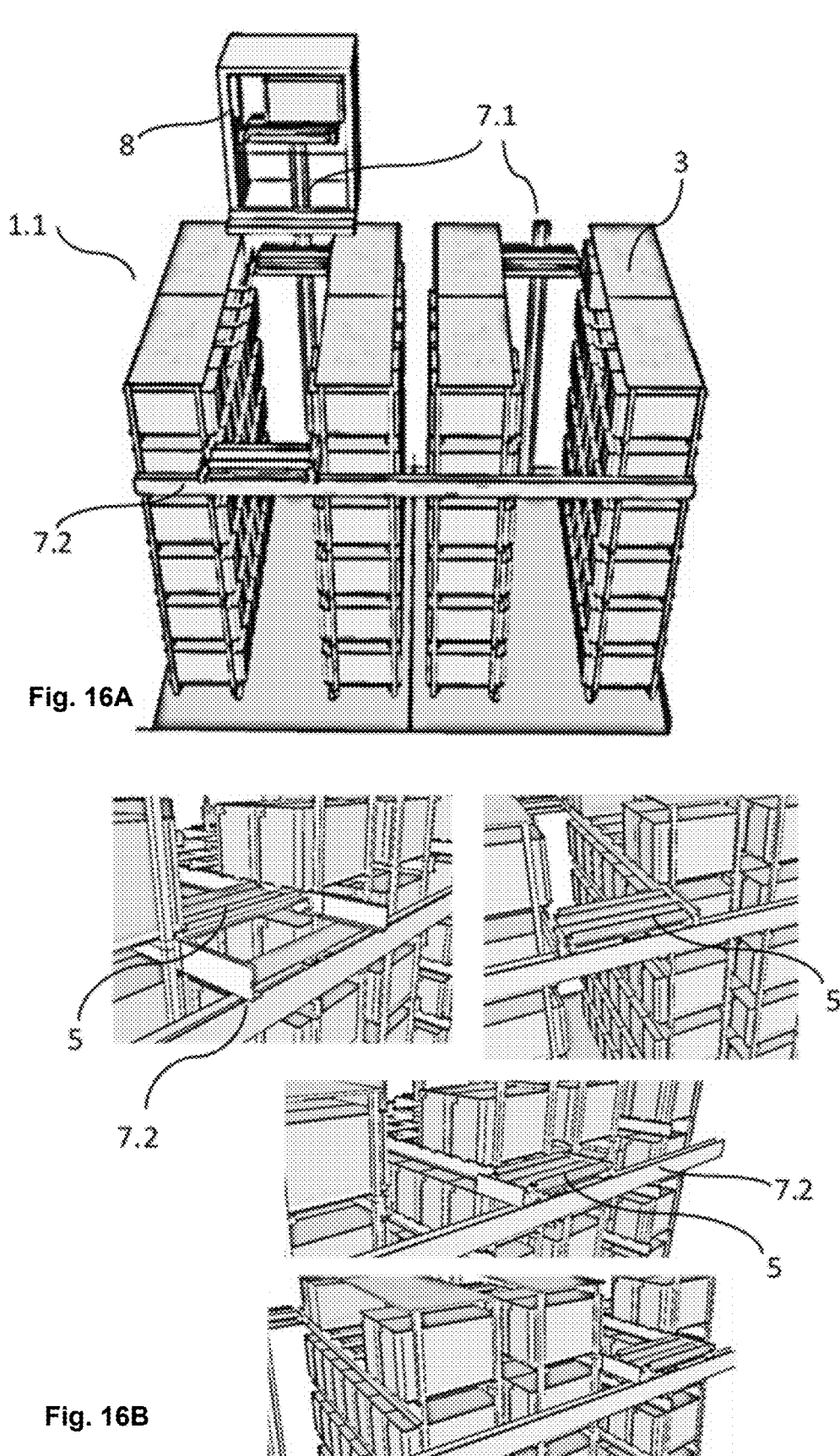

FIG. 16A illustrates an example of APAP 1.1 warehouse implementation with two aisles using vertical (7.1) and horizontal (7.2) commuting robots, shown in a perspective view.

FIG. 16B illustrates an example of APAP 1.1 warehouse implementation with two aisles using vertical (7.1) and horizontal (7.2) commuting robots, showing the process of moving the warehouse shuttle 5 from one aisle to the second aisle using a horizontal switching robot 7.1, in which 3—warehouse racks with two aisles; 5—warehouse shuttle; 8—external port of the APAP.

DETAILED DESCRIPTION OF INVENTION

The essential element of this invention is an Automated Postal Logistic Module or APLM 1 which presents a single point of an Automated Postal Delivery Network, APDN. An example construction of such APLM is presented in FIG. 1. The APLM 1 comprises a rugged waterproof and, if necessary, thermally insulated warehouse 2 with internal shelving 3 for storing postal items 26 in closed parcelboxes 14, an internal robotic arrangement comprising of one or more robots 5, 7 installed in the warehouse 2, and one or more external ports 8 for loading parcelboxes 4 into and out of the APLM 1. Preferably, all components of the APLM 1 are operated automatically under control by internal and external control systems 26 and 412.

The term "postal item" 26 in the scope of the present invention refers to a wide class of parcels, commercial parcels, goods, commodities, sales items, mail items, press items, correspondence items and any other items which can be delivered over the APDN, comprising more than one aforementioned APLMs. All postal items 26 are closed into and delivered over the postal network in parcelboxes 4.

The concept of the APLM considers a versatile technical unit performing functions of automated loading, unloading, and storage of parcelboxes 4. However, in practical postal networks, the APLM concept may be implemented in a variety of different sizes, shapes, and embodiments.

In one aspect, the APLM s may be configurable as either of:

Automated Postal Access Point (or APAP) 1.1, accessed by users, for delivering and receiving postal items 26;
   Automated Postal Network Node (or APNN) 1.3, serving as an intermediate warehouse on the delivery itinerary between APAPs;
   Automated Cargo Compartment on a postal delivery Vehicle (or ACCV) 1.2, for transporting parcelboxes 4 among and between APAPs and APNNs.

The stationary APLMs (APAPs and APNNs) can be implemented in several ways:

preferably, underground or underfloor, for example, in a
   concrete or other rugged waterproof housing, with the
   external port (ports) 8 are accessible above the ground
   level, for users and ACCVs to load and unload parcel-
   boxes 4. The space/area occupied by such underground
   APAP 1.1 is minimized, due to its vertical format and
   internal shelvings 3 arranged in multiple floors (levels).
on the ground surface; the APLM's external ports 8 can be
   either top- or side-oriented, preferably according to
   technical conditions and local restrictions. This imple-
   mentation type may be convenient for temporary
   APAPs and APNNs; for example, the dimensions of a
   mobile APAP make it possible to place it in a parking
   space for a car; for example, the dimensions of mobile
   APNN may have a standard sea-container format which
   can be transported to the temporary place by a truck.
inserted into niches of buildings, with the external port
   (ports) 8 accessible for users to receive and deliver
   postal items 26, and for ACCVs 1.2 to interchange
   parcelboxes 4; for example, in dense urban locations, it
   may be convenient to use technical premises of build-
   ings for APAPs 1.1 and APNNs 1.3; e.g., a dedicated
   room with an external window at a city post-office may
   serve as APNN, or a technical room in an apartment
   building may serve as an APAP.

The ACCVs 1.2 are mobile implementations where
APLMs are considered as automated cargo compartments of
(on) postal vehicles. There is no limitation on how such
APLM is implemented on a postal vehicle. It can be either
a temporarily mounted cargo compartment, or an insepa-
rable part of the postal vehicle, or a cargo trailer connected
to the vehicle, etc. The vehicle may be of any applicable
type, for example, postal truck or minibus, human-driven or
autonomous, gas-fueled or electric, etc. An important feature
on the ACCV 1.2 is its ability to adjust and to couple the
external port of the ACCV 1.2 with external ports 8 of
APAPs 1.1 or APNNs 1.3, for automatic interchanging
parcelboxes 4 through the coupled external ports 8. This
feature of coupling external ports 8, may be implemented
either as a part of the postal vehicle, or a part of the APLM
on the vehicle, or both.

Further, APLMs can be of different sizes, shapes, and
capacities, depending on the postal application and local
conditions. For example, APNNs 1.3 may be larger and
more capacious than APAPs 1.1. The shape and size of
particular APLMs may be adapted to local physical restric-
tions in buildings, postal vehicles, and free areas/spaces for
implementing new APLMs.

An example of APLM different configurations and their
mutual interactions is depicted in FIG. 2. Parcelboxes 4 can
be automatically transferred between two APLMs 1 (as in
FIG. 2*a*, between ACCV 1.2 and APAP 1.1 or APNN 1.3),
when their external ports 8 are coupled and warehouse
shuttles 5 and elevators 7 enable transfer from one ware-
house to another.

APLM construction. Independently of the above varia-
tions, all APLMs comprise these essential technical ele-
ments, functions, and features (FIG. 2 *a-b*):

a waterproof and, if necessary, thermally insulated ware-
      house 2 with shelving 3, for placing and storing par-
      celboxes 4,
   a robotic shuttle 5 mounted inside the warehouse 2 for
      moving parcelboxes 4 between and along the shelvings
      3,
   an external port 8 for transferring parcelboxes 4 into and
      out of the warehouse 2, a second robotic module 7 for transferring parcelboxes 4
      into and out of the warehouse 2 through the external
      port 8,
   a security door 9 limiting access into the APLM's ware-
      house 2 through the external port 8,
   an autonomous power supply 27 and internal control
      system 26 having communication means for remote
      connection 421 and external control of the APLM,
   the external port 8 of the APLM 1 is arranged for
      interchanging parcelboxes 4 with another APLM 1.

Postal items 26 are stored inside APLMs 1 and transferred
between APLMs 1 in closed parcelboxes 4. Preferably, these
parcelboxes 4 are thermally insulated, and openable manu-
ally only when being present outside of APLMs 1. This
feature of using closed parcelboxes provides 1) for all postal
items 26 a unified format which is supported by APLM's
robotic shuttles 5; 2) postal items 26 being always closed in
parcelboxes 4 thus protected; 3) the APLM's internal equip-
ment is, at least partially, also protected from contamination,
e.g., with liquids or aggressive materials possibly contained
in delivered postal items 26.

In some embodiments of APLM, the first and second
robotic modules 5 and 7 can be joined into a single robot or
robotic module 5,7 which performs all functions of moving
parcelboxes 4 among the shelving 3 inside the warehouse 2,
and of transferring parcelboxes 4 into and out of the ware-
house 2 through the external port 8.

Further the robotic module, at least, the robotic shuttle 5
transferring parcelboxes 4, comprises means for instant
weighting of the parcelboxes 4 and verifying the weight of
the transferred parcelbox 4 and postal items 26 in it. Instant
weighting step can be done before transferring parcelbox 4
to another place, or before placing the parcelbox 4 onto
shelving 3, or temporarily withdrawing the parcelbox 4 from
shelving 3, weighting it, and then returning it onto the
shelving 3.

All APLMs 1 comprise means to maintain the tempera-
ture, humidity, and aeration inside APLM warehouses 2, for
supplying the dry air in the warehouse 2 and preventing
condensation appearance. Additionally, to support stable
temperature inside the warehouse 2, the housing of the
warehouse 2 can be thermally insulated.

All APLMs 1 further comprises supportive Clean-in-
Place (CIP) features (FIG. 4) assisting to clean warehouses
2, at least, CIP-resistant internal walls, sloped lines on the
warehouse floor, and a floor recess 49 for collecting liquids
occasionally spilled out of the parcelboxes 4 or collected in
the result the CIP-service. An example of CIP-cleaning is
presented in FIG. 4.

All APLMs are mainly powered by rechargeable batteries
27, allocated in their warehouses 2. APLMs comprise their
own autonomous power supply sources that make APLMs
independent from external mains electricity networks. Pref-
erably, such power supply sources comprise at least two
rechargeable batteries, allocated on shelvings 3, and packed
in a format of standard parcelboxes 14. The replacement of
the rechargeable batteries is done by interchanging parcel-
boxes with the batteries in the same way as interchanging
parcelboxes with postal items 26 between APLMs. Option-
ally, APLMs can be connected also to a local mains network
for recharging APLM batteries without replacing them.

APLMS 1 comprise internally their autonomous control
system's 27 and communication means for external control
via a remote connection 421, and a local input means that
can be a keyboard, a touchscreen, various biometric identi-
fication scanners, RFID scanners, or the like.

APAPs 1.1, optionally and especially for users, can have a second external port for loading and unloading parcelboxes 4, a second security door limiting access through the second external port, and a third robotic module for loading parcelboxes 4 into and out of the warehouse 2.

APLM robotic operation. Moving of parcelboxes 4 inside APLMs is performed by a warehouse robot (shuttle) 5, which is a robotic autonomous vehicle powered by its internal battery. This internal battery is recharged from the APLMs main batteries 28. The warehouse shuttle 5 moves on special rails along shelves and performs positioning of parcelboxes 4 on the shelves 3, takes parcelboxes off the shelves 3, moves them between the sector of shelving and the APLM's module of loading/unloading. The positioning of parcelboxes onto and off the shelving is done with the transversal rails 29 and pushing mechanism 31.

The warehouse shuttle 5 is a specialized autonomous warehouse robot for transporting parcelboxes 4, capable of moving on special horizontal rails laid along the warehouse shelves 3. The warehouse shuttle 5 is equipped with a lateral displacement mechanism 31 for a parcelbox 4. This mechanism 31 can be used when moving a parcelbox 4 to the warehouse shelf 3 or from it back to the warehouse shuttle 5, as well as from the warehouse shuttle 5 to the external port 8 of another APLM and back, from the external port 8 another APLM to the warehouse shuttle 5. The warehouse shuttle 5 is controlled by the control system, either the internal APLM control system 27 or/and ADPN control system 412. Also, several warehouses shuttles 5 can operate simultaneously in one APLM 1. The charging of the autonomous warehouse shuttles 5 can take place on the carriage of warehouse elevator 7 when warehouse shuttle 5 is on it.

The warehouse shuttle 5 can transport one parcelbox 4 (as depicted in FIG. 3*a-c*) or can be a larger unit arranged to transport several parcelboxes 4 at one time (as depicted in FIG. 3*d*).

Warehouse elevator 7 is used to move the warehouse shuttle 5 vertically between the shelving 3 levels of the APLM warehouse module 2, as well as to the external port 8 for sending/receiving shipments. The warehouse elevator 7 can be a standard machine with a lifting carriage moving along vertical rails. The carriage is adapted to accommodate the warehouse shuttle 5 carrying the parcelbox 4. Warehouse elevator 7 can receive a command to move from the warehouse shuttle 5, which needs to move up or down. The design of warehouse elevator 7 is made taking into account the possibility of its removal outside the warehouse module 2 for replacement or maintenance without access to warehouse module 2.

All operations of the warehouse shuttle 5 and elevator 7 with parcelboxes 4 in the APLMs 1 arranged to be executed automatically. Loading and unloading APAPs 1.1 is carried out automatically employing unmanned or, if necessary, manned special postal vehicles, or manually.

Automated or fully automatic transfer (or interchange) of parcelboxes 4 between two APLMs 1 can be demonstrated according to FIG. 3*e*. This figure depicts how warehouse robot 5 on warehouse elevator 7 enables the transfer of a parcelbox 4 into the external port 8 for loading/unloading the parcelboxes of the ACCV 1.2 which is the same APLM 1. The external port 8 for loading/unloading the parcelboxes ACCV can be made as, for example, a roller section. The ACCV 1.2 also has its warehouse robot (shuttle) 5 and elevator robot 7, which by the same pushing mechanism 31 accepts the parcelbox and further transports it into its warehouse, thereby implementing automatic transfer or interchange of the parcelbox 4 between two APLM warehouses.

It is important to highlight that the aforementioned differences between APAPs, APNNs, and ACCVs are rather relative but not strictly distinctive. In general, there may be possible cases when the same APLM can be considered as APAP and APNN, and ACCV. For example, a trailer-mounted-APLM could serve as any of them, providing features of parcelbox 4 storage, loading and unloading postal items 26 into and from parcelboxes 4 by users, and automated interchange of parcelboxes 4 with another same or similar APLM. While ACCV-feature of an APLM being mobile becomes implemented when such trailer-mounted-APLM is coupled to any postal vehicle and transported to another location as a mobile APLM. The example of such versatile APLM 1 is depicted in FIG. 8.

Servicing APLMs. In the construction of an APLM 1, its internal devices can be detached, unmounted and extracted, for maintenance and repair processes in distant service workshops. The replacement modules and devices for loading/unloading, warehouse shuttles 5, and warehouse elevator 7 are immediately installed instead, then, the APLM restarts its operation.

Cleaning APLMs. APLMs have to be cleaned and disinfected regularly. Cleaning (washing and disinfecting) of the APLMs warehouse is carried out by Clean-In-Place (CIP) means, in the automatic mode known in the industry.

Floor slopes of warehouse module 2 are made such that the drained washing liquid enters into a special recess 49 in the floor, from where it is removed by a pump integrated with CIP equipment in the service shuttle 41.

Regular CIP procedures to be done by a special CIP vehicle 41 comprising capacity of liquid 42 and technical arrangements for cleaning and disinfecting APLM warehouses 2 internally through the external ports 8. An example of cleaning an underground/underfloor APLM 1 is presented in FIG. 4. Cleaning and disinfection are important for APLMs, to ensure that postal delivery service is safe and protected from dangers (of infecting, poisoning, smudging, etc.). The CIP-procedure is performed by following steps:

Unloading parcelboxes 4 from the APLM 1, and unmounting out internal robots 5 and 7;

Mounting external CIP tools into the warehouse and cleaning it; the CIP-tools 43-48 wash away debris and dirt with jets of the water and/or a disinfectant solution. The shelves and the enclosure of the warehouse module 2 must be made of materials resistant to such regular sanitization by CIP tools;

Collecting the used CIP liquid back to the service vehicle 41;

Drying the warehouse 2;

Mounting the warehouse robots 5 and 7 back into warehouse 2, and loading parcelboxes 4 back into warehouse 2;

Restarting the APLM 1 for further operation.

The CIP liquid collected after the washing step can be reused. For example, for cleaning the next APLM 1 on the route of the service shuttle 41.

Elimination of manual labor in the CIP procedure is achieved, by using the same warehouse robot 5 and robot elevator 7 which both move parcelboxes 4 temporarily out from and back into the warehouse module 2. When the cleaning and drying takes is carried out, afterward, warehouse robot 5 is installed back into the warehouse module 2. Afterward, the APLM device 1 is restarted and becomes ready for further operation.

Parcelboxes 4, after each using cycle, pass the procedure of automatic cleaning and verification for further usability. Each parcelbox 4, after using it, is transported to the nearest APNN or service workshop, to carry out this service procedure.

Postal delivery network. A plurality of differently configured APLMs constitutes an Automated Postal Delivery Network (or APDN) which is enabled to operate in fully automatic mode. Such ADPN and its constituent elements are presented in FIG. 5. For this purpose, the APDN comprises APAPs 1.1, APNNs 1.3, and ACCVs 1.2, which are arranged to transfer parcelboxes 4 between any two APAPs 1.1 as end-nodes, thereby enabling users to deliver and receive postal items 26 in parcelboxes 4 over the APDN.

The APDN is controlled as the whole network to perform delivery, controlled by the ADPN control system 412, depicted in FIG. 6.

In the ADPN control system, each APLM 1 has its own internal control system 26 performing control functions for the autonomous operation of the APLM.

Further, a central control system 412 is involved to control the APDN as a whole network. This control system 412 comprises at least one processor and memory, and control methods 432-462 are executed in the system, controlling each APLM 1 and enabling users to be registered and authenticated in the APDN, and to deliver and receive postal items 26 in parcelboxes 4 over the APDN. The central control system 412 without any restrictions can be implemented as a physical server, a cluster of servers, virtual server, in a cloud, etc.

Further, the control system 412 is connected with all APLMs 1 by remote connections 421, preferably, by wireless technologies (e.g., WiFi, GPRS, 4G, 5G or others), and preferably by secure encrypted protocols (VPNs, IPSec, etc.).

The APDN and its control systems and methods are operated by a "postal operator" or "postal delivery service provider" which manages all technical means necessary to provide postal delivery service (APLMs, network control systems, APLM service shuttles, CIP-services, etc.) The "recipient" is understood as a person who receives postal items 26 in the parcelbox 4. The "sender" is understood as a person who sends or delivers postal items 26 in the parcelbox 4 by the delivery service implemented on ADPN.

Operating the automated postal delivery network (ADPN). APLMs and networks thereof are operated in several modes by methods, depending on APLM configurations. A variety of digital control methods, known in the industry and for persons skilled in the art, are not described in detail in the present application. For example, registration and identification (authentification) of postal service users may be realized by employing methods known from digital and electronic systems. A variety of methods for routing items across networks are also known: unless a specific method is not disclosed, thus any known network routing methods could be implemented in APDNs to transfer parcelboxes 4 from senders over the ADPNetwork to recipients. Monitoring and alerting statuses of all APLMs in the APDN network is also considered an obvious feature that is not necessary to describe in detail.

In the present invention, there are 3 essential and specific sub-methods (stages) for automatic loading, unloading and transferring/interchanging parcelboxes 4 into, out and between APLMs:

A. stage of loading postal items 26 in parcelboxes 4 into APAP 1.1,

B. stage of unloading postal items 26 from parcelboxes 4 at APAP 1.1, C. stage of transferring/interchanging parcelboxes 4 between APAPs 1.1, APNNs 1.3, and ACCVs 1.2.

Stage (A) of loading postal items 26 in parcelbox 4 comprises steps at least of:

identifying a delivering user via remote connection or a local display with local input means, such as keyboard, touchscreen or the like of the delivering APAP 1.1, identifying a postal item (26) to be delivered (weight, size, picture, etc.), identifying the receiving user and the receiving APAP 1.1, opening the external port 8 of the delivering APAP 1.1 and provide a parcelbox 4 to user's place 6 for loading the postal item 26;

identifying the provided parcelbox (4) to be delivered;

loading the parcelbox 4 into the delivering APAP 1.1 and allocate in the warehouse 2 on the shelving 3;

optionally, weighting the parcelbox 4 during the loading stage thereof, with weighting means of the robotic shuttle (5).

Stage (B) of unloading postal items 26 from parcelboxes 4 at APAP 1.1 comprises steps at least of:

identifying a receiving user, via remote connection or a local display and keyboard of the receiving APAP 1.1, identifying the parcelbox 4 with the delivered postal item 26 location in the warehouse 2 of the receiving APAP 1.1, transferring and place the parcelbox 4 onto user's place 6 for unloading the postal item 26 from the warehouse 2 and open the security doors of the external port 8, loading the empty parcelbox 4 back into the APAP 1.1;

optionally, weighting the parcelbox 4 during the unloading stage thereof, with weighting means of the robotic shuttle (5).

Stage (C) of transferring or interchanging parcelboxes 4 between two APLMs 1 comprises steps at least of:

identifying that the external ports 8 of two APLMs 1 are coupled and ready to transfer or interchange parcelboxes 4 between the two APLMs 1, identifying the parcelboxes 4 that have to be transferred or interchanged between the coupled two APLMs 1;

opening the security doors 9 on the external ports 8 of the two APLMs (1);

interchanging of the identified parcelboxes 4 between said two APLMs 1;

allocating the interchanged parcelboxes 4 inside the warehouses 2 of said APLMs 1;

closing the security doors 9 of the APLMs 1;

optionally, weighting the parcelbox 4 during the transfer stage thereof, with weighting means of the robotic shuttle (5).

The above steps disclose the automatic way of operation of APLMs 1, thereby, APAPs 1.1, APNNs 1.3, and ACCVs 1.2. More detailed automatic operation steps are defined by the disclosed specific technical constructions of the warehouse robots. For example, the steps how the warehouse robot 5 moves on rails, how it places the parcelbox 4 on the shelving 3—this is defined by the disclosed construction of the warehouse robot 5, shelving 3, and parcelbox 4.

Automated exchange of parcelboxes between APLM modules, and means thereof. Automatic transfer of parcelboxes 4 among APLM 1 modules (between two of them at a time) is necessary for the functioning of the Automated Postal Delivery Network (APDN), and it is employed for commuting parcelboxes 4 between APAPs and ACCVs, between APNNs and ACCVs, and with no restriction also between two ACCVs 1.2.

Automatic trasfer of parcelboxes 4 between two designated APLMs 1, where one of them is ACCV 1.2 and another one is APLM of any type, is performed by the following general stages, technical means and corresponding methodic operations:

1) automated positioning means for cross-docking a ACCV 1.2 shuttle to an APLM 1 of any other type. That is ACCV 1.2 transports parcelboxes 4 between and among stationary modules of APAP 1.1 and APNN 1.3 type. It is not restricted that an ACCV 1.2 can interdock also with another transport ACCV 1.2, and reload parcelboxes 4 between them. When positioning, the main purpose is that the external ports 8 of the two APLMs 1 approached exactly each other, for interdocking for the transfer, and sequential reloading of parcelboxes 4. For this, various technical means of precise docking can be used, such as wheel guides and limiters (stops) of ACCV wheel movement, bumpers, precision-lifting jacks 17 for the APLM and stationary mechanical supports 18, various sensors for positioning (optoelectronic sensors, lidars, ultrasonic sensors, and others), as well as a moving platform on the ACCV 1.2 vehicle, which allows, within certain limits, to make 3D-positioning of the ACCV's postal module, for interdocking said two APLM modules.

2) automated means of docking external ports 8 and transferring parcelboxes 4 between the external ports 8 of the two cross-docked APLM modules. These means can be bridges with roller-conveyors 19 along which parcelboxes 4 move, rail jumpers 35 along which a warehouse vehicle moves, or the like. Such rails or conveyor bridges are automatically installed after the APLMs are already positioned to each other, and after the transfer of parcelboxes 4 is completed, they are removed by pulling them inside into the postal modules, i.e., APLMs of the mentioned three types. Precise positioning between APLMs before cross-docking is carried out by the above-mentioned positioning means.

3) automated means of unloading parcelboxes 4 from the warehouse 2 of the APLM module 1 (such as warehouse robots 5, 7), to the means of transfer between APLMs (such as conveyor bridges 19 or rail jumpers 35), and sequential loading of the transferred parcelbox 4 from the means of transfer (conveyor bridges, rail jumpers) to the warehouse 2 of the second APLM. The means of such a transfer are the warehouse's 2 internal APLM robots 5 and 7, which are implemented and employed to move parcelboxes 4 inside warehouse 2. In the case of automatic transfer, they (5, 7) are also technically adapted to exchange parcelboxes 4 with a means of docking and automatic transmission (19, 35) between APLMs 1. It can be the same warehouse robot 5, technically adapted for this, or an additional second robot 7, for example, a robot-elevator in the vertical direction of the APLM, which reloads parcelboxes 4 from the warehouse robot 5 to the transferring conveyor bridge 19, and in the opposite direction.

More specific technical implementations (embodiments) of the above automatic transfer means are depicted in FIGS. 8-14 and described in detail in the subsequent paragraphs.

Implementation of means of internal transfer of parcelboxes within the APLM warehouse and to/from the external port of the APLM. The interior space of APLM warehouse 2 is organized by rack shelving 3, on which parcelboxes 4 are allocated and stored. Shelving 3 is made up of rows of racks, between which there are aisles where the warehouse robot 5 moves along its rails (in the aisle between two rack rows), as shown in FIG. 16. There can be several such rows of shelving racks 3 in the APLM warehouse 2, and there may also be several storey rows (floors).

The warehouse shuttle 5 can be a single robot for all rows of warehouse 2, or, to speed up the internal transfer work, there can be several warehouse shuttles 5 in different rack rows, working independently of each other.

Commuting parcelboxes 4 among shelving racks 3 and to the external port 8 of the APLM warehouse 2 is usually carried out by an additional robotic device 7, which can be a robot-elevator (7, 7.1) between the shelving floors, or a horizontally-moving robot-platform (7, 7.2) for transferring a parcelbox 4 or the robot 5 between the rack rows, or a vertical-horizontal (2D-coordinate) arrangement of robots for moving parcelboxes 4 or the warehouse shuttle 5 with the parcelbox 4.

An example of the internal organization of the APLMa warehouse 2 is shown in FIG. 16: APAP 1.1 with two aisles by vertical (7.1) and horizontal (7.2) switching robots: a) perspective view; b) process of moving the warehouse shuttle 5 from one aisle to the second aisle, using a horizontal switching robot 7.1. 3—shelving racks with two aisles; 5—warehouse shuttle; 8—external port.

Parcelboxes 4 can be transported to and from the external port 8 by several methods and by the corresponding means. One option is when the warehouse shuttle 5 or the commuting robot 7 brings the parcelbox 4 to the external port 8 and settles the parcelbox 4 onto the driven or static conveyor-bridge 19 to transfer the parcelbox 4 to the docked other APLM 1.

Another option is when two APLM modules (a mobile ACCV 1.2 docked to the other APLM of any type) are connected by a rail jumper 35, and the warehouse shuttle 5 or the commuting robot 7 moves with or without a parcelbox 4 to the docked other APLM, and therein it also performs the movement of the parcelboxes 4, internally and outside of that other APLM.

Based on the above clarification, various implementation options for robotic organization are possible within APLMs and between cross-docked APLMs, beginning from a single warehouse shuttle 5, which works alone within two docked APLMs, moving parcelboxes inside and between APLMs, under the control of a common computerized system of the entire automatic postal network. A more complex option can include several warehouse shuttles 5, for example, one shuttle 5 on each aisle of rack-rows, and on each floor of rack-rows—in this case, it is possible to speed up the movement of a plurality parcelboxes 4, due to several warehouse shuttles 5 working in parallel and independently from each other. It is also possible that on each level (floor) or row, the warehouse 2 comprises a dedicated multi-seat warehouse shuttle 5, thereby speeding up the transfer of parcelboxes 4 within warehouse 2.

Furthermore, since the robotization of mobile ACCVs 1.2 is associated with the need for technical simplicity and reliability, it is technically and energy efficient to keep no warehouse robots 5 and 7, but only shelving racks 3 with parcelboxes 4 in the mobile ACCVs 1.2. On the other hand, it is not restricted that the mobile ACCV 1.2 has installed its warehouse shuttle 5, which moves parcelboxes 4, for example, when two ACCVs 1.2 are docked, e.g., in a case when one ACCV 1.2 stops at an unforeseen place due to technical reasons, and it becomes necessary to reload all parcelboxes 4 from the failed ACCV to another ACCV 1.2.

Implementation of the positioning means for cross-docking external ports of APLMs. Before the parcelbox 4 transfer procedure, ACCV 1.2 is positioned to an APAP 1.1 or APNN 1.3 in such a way that the external port 8 of the ACCV 1.2 would approach directly opposite to the external port 8 of the APAP 1.1 (FIG. 10 *a*) or the APNN 1.3 (FIG. 10 *c*). There is no restriction also for mutual positioning for docking of two ACCVs 1.2 (in FIG. 13, FIG. 14) each other. In this case, for preliminary horizontal positioning, various kinds of guiding elements 16, as well as supports 18 of the ACCV's vehicle movement and final position, can be used. For vertical positioning, and precise positioning in the horizontal plane, jacks 17 with corresponding supports 18 having their upper surface of the form of a cone, sphere or other self-positioning surfaces can be used. Those, when extended, in addition to the vertical positioning, also provide compensation for the preliminary positioning error in the horizontal plane (FIG. 12 *b*). The jacks 17, typically, are installed on the ACCV 1.2. Said jacks 17 are extended-out by the instruction given from the ACCV 1.2 control system, and they can have 2 states: extended or retracted. Correspondingly, the supports 18 which are complementary for these jacks 17, are fixedly installed (being maintenance-free) at the ACCVs parking lot, next to APAP 1.1 or APNN 1.3. The ACCV's positioning accuracy is ensured by the correct arrangement of complementary stops 18 with the APAP 1.1 or APNN 1.3, which can be ensured by a strong mechanical connection of the stops 18 with the APAP 1.1 or APNN 1.3.

When the ACCV 1.2 is approaching the APAP 1.1 at a slow speed, the ACCV wheels follow along with guides 16 until an ultrasonic stop-position sensor 14 is triggered. After the ultrasonic sensor 14 is triggered, the ACCV's control system 27 stops it after a distance equal to the distance between sensor 14 and support 18. This places the positioning jack 17 directly above the complementary mechanical support 18. After stopping, the ACCV 1.2 control system extends the positioning jacks 17 out to the complementary supports 18, thus ensuring the precise positioning of the ACCV 1.2 in front of the APAP 1.1.

An economically efficient, reliable, and technically feasible technical solution is the following. The ACCV 1.2 must have an adjustable hydraulic or pneumatic suspension with 4 swivel wheels. Thus, the regulation of the external port (8) position is ensured horizontally and vertically. A stopper is needed for pneumatics to fix the position after positioning, it is possible without the stopper, but then the positioning system becomes more expensive, more complicated, and less reliable. Meanwhile, the set of positioning sensors comprises a combination of a laser measuring system and a computer vision system.

Mechanical positioning means are by far the most accurate, inexpensive, and reliable. In this application, accuracy is especially important. Positioning with a standard vehicle-positioning-lidar can achieve a basic accuracy of up to 50 mm, which is not enough for this application. The accuracy of technical (computer-based) vision is much higher. But the specifics of technical vision is that it employs a constant focal length. There are zoom cameras, but they are targeted for finding and counting objects, not for measuring. Further, there are traditional laser measuring instruments that work quickly and accurately, but only on individual points. Although multi-point meters are also known, which are a set of measuring sensors arranged in a fan (used as safety barriers). It is important that position sensing means that works at a distance of several meters will not be able to accurately work at a short distance. Therefore, it is preferable and efficient to use a combination of means for preliminary and fine positioning, with the above described mechanical positioning means in this combination being the main ones. Also, a possible solution is to use a special sensor of the horizontal position, within said combination of sensors.

To position the ACCV 1.2 shuttle to a stationary APLM, it is needed to change the position of ACCV 1.2 along 6 axes: 3 linear in space and 3 angular in direction. Therefore, one of the solutions is to use hydraulic or pneumatic suspension instead of jacks, which will solve positioning along 3 axes—2 angular and linear vertically. The remaining 3 axes should be obtained by wheel drive. The ideal solution is to use 3 or 4 (depending on the wheel formula) swivel and drive wheels. Moreover, the angle of rotation must be greater than 180 degrees. These properties are possessed by modern motor wheels mounted on a rotary vertical axis. But this solution is expensive and technically complex. Therefore, positioning can also be performed using a standard wheel formula with one pair of front swivel wheels. To do this, the ACCV 1.2 must drive the APAP 1.1 side-by-side in such a way that a special geometric symbol with exact dimensions printed on the APAP 1.1 appears in the focus of the vision camera installed on the ACCV 1.2. At the same time, there must be ensured the horizontal position of the ACCV 1.2 platform at this moment. At the time of passage, the camera produces a series of images, the analysis of which allows the ACCVs control system to accurately determine the distance to the APAP 1.1 and the slope of the movement trajectory. With this information, the ACCV control system develops an accurate trajectory for the ACCV 1.2 when reversing, bringing the ACCV 1.2 to the desired path inclination, and the desired point in front of the APAP 1.1. After that, the vision camera can take a test picture, the analysis of which will confirm the correct position. If the position accuracy is unsatisfactory, another positioning iteration can be performed.

One more applicable technical solution within the positioning means is positioning the ACCV shuttle along a line drawn on its path. The ACCV 1.2, when approaching the APAP 1.1 or APNN 1.3, crosses the drawn line, and, using technical vision means, moves strictly along this line at a low speed to a special mark. At the same time, a sufficiently high positioning accuracy (up to several millimeters) is obtained. To use the option on the street, the line can be magnetic, and the sensors can be used for sensing the magnetic field (Hall sensors). The accuracy can be up to 5-10 mm. The specific solution depends on the climate zone, the environment, and the behavior of the inhabitants.

The horizontal position of the ACCVs warehouse platform can be achieved either by:

a controlled pneumatic or hydraulic suspension, which is controlled by horizontal position sensors, or by creating an even, strictly horizontal parking space for the ACCV 1.2, which must have a very rigid short-travel suspension that eliminates noticeable distortions with uneven distribution of the load. At the same time, the condition of the parking space should be constantly monitored, the precisely horizontal level of which can be erroneously affected by the appearance of debris, snow, ice, as well as seasonal ground fluctuations.

Therefore, a controlled suspension platform in combination with a technical vision system can be a preferable, working, and technically feasible option.

There is also a practical option for automatically reloading parcelboxes 4 between two ACCVs 1.2, as presented in FIG. 13: a) an ACCV 1.2 is being positioned opposite another ACCV 1.2; b) two ACCVs positioned each other; in FIG. 14: the two ACCVs 1.2 exchange parcelboxes: 4—parcelbox; 8—external port ACCV 1.2; 9—open security door; 30—fan-shaped laser measuring sensor: 413—laser measuring beams.

Exchange or reloading parcelboxes 4 from one ACCV 1.2 to another ACCV can be done at any accessible flat place, for example, in a car park. The first ACCV 1.2 is parked on the site in such a way that there is enough space in front of its external port 8 to park the second ACCV 1.2 (FIG. a). The second ACCV 1.2 enters the site and goes towards the first ACCV 1.2 so that its external port 8 faces the external port 8 of the first ACCV 1.2. When approaching the first ACCV 1.2 at a slow speed, the second ACCV 1.2 enters the measurement zone of the fan-shaped laser sensors 30 installed on the ACCVs, after which the ACCV 1.2 movement control is transferred to the autopilot-positioner installed on the ACCV 1.2. The autopilot-positioner, receiving the results of measuring the distance to the first ACCV 1.2 from all laser meters of the fan-shaped laser sensor 30, builds the route of the ACCV 1.2 in such a way that the ACCV 1.2 stops parallel to the first standing ACCV 1.2 at the exact predetermined distance, while the external port 8 is approaching ACCV 1.2 was located exactly opposite to the external port 8 of the standing ACCV 1.2. After receiving confirmation from the autopilot of the positioner about the successful positioning, ACCVs go into the cross-docking and afterward to the transfer mode of parcelboxes 4. For this, both ACCVs 1.2 open their security doors 9, on the bottom of which a roller conveyor bridge 19 is installed for transfer (FIG. 14). As a result, a transfer channel of parcelboxes 4 is formed from one ACCV 1.2 to another ACCV 1.2. The sequence of operation steps for transferring parcelboxes, in one ACCV 1.2 fully corresponds to the sequence of operation steps in another ACCV 1.2, for transferring and receiving parcelboxes 4, in the same way, as between the ACCV 1.3 and a stationary APLM (APAP 1.1 or APNN 1.3) (FIG. 8).

a) Parcelbox 4, taken off by the warehouse shuttle 5 from the warehouse shelving 3 of the first ACCV 1.2, further is delivered by the robot-elevator 7 to the level of the external port 8 of the ACCV 1.2, after which the warehouse shuttle 5 is positioned opposite to the external port 8. After that, the pushing mechanism 31 of the warehouse shuttle 5 with the cam 32 starts to push into the U-shaped stop 33 at the bottom of the parcelbox 4, thereby causing the parcelbox 4 to move to the driven roller-conveyor 19 of the ACCV 1.2, located in front of the external port 8, and further, through the established transfer channel between two ACCVs 1.2, to the driven roller-conveyor 19 of the second ACCV 1.2.

b) The driven roller-conveyor 19 of the second ACCV 1.2 receives the moved parcelbox 4, and positions it in such a way that the warehouse shuttle 5 of the second ACCV 1.2 can load on itself the accepted parcelbox 4, and then transfer it to the specified warehouse location on the shelving 3 of the second ACCV 1.2.

c) Automated actions of parcelbox transferring occur in both directions until the moment of complete reloading of all parcelboxes 4, according to the received confirmations from ACCVs control systems 27 and ADPN the control system infrastructure 412 (FIG. 6).

Cross-docking of APLMs and transfer of parcelboxes between APLMs. After the step of APLMs positioning, the security doors 9 of the external ports 8 open, allowing the docking of both APLMs, and then the procedure for automatically transferring parcelboxes 4 between the APLMs begins.

Depending on the applicable and used method of automatic transmission (described below, 1st or 2nd methods), the external port 8 and its security doors 9 can have different sizes, ranging from a small port-door configuration from which parcelboxes 4 are loaded and unloaded sequentially one by one (by roller-conveyor 19 or single rail-bridge), and to the largest external port configuration that can be through the entire side- or rear-wall of the APLM, when the protective doors are opened, and then it becomes possible to dock the warehouse shelves 3 between the two APLMs, for transfer by the 2'nd automatic transfer method using multiple rail-bridges cross-docking shelving-racks 3 of both APLMs.

To automatically transfer a parcelbox 4 between an APLM 1 and an ACCV 1.2, two main methods are used:

1. method: using the pushing mechanism 31 mounted on the warehouse shuttle 5, as well as additional mechanisms for moving the parcelbox 4, such as a roller-conveyor 19 (FIG. 8 *b*). These mechanisms can operate in forward and reverse modes, therefore, are used both for transferring and receiving the parcelbox 4. Warehouse robots 5 are equipped with a pushing mechanism 31 for moving the parcelbox 4 along the directing guides 29 (FIG. 8 *a*). The mechanism has 2 pushing cams 32, moving also in reverse mode, through the complementary U-shaped stops on the bottom of the parcelbox 4 (FIG. 8 *b*).

a) Parcelbox 4, allocated onto the warehouse shuttle 5, is delivered by the robot-lifter 7 to the external port 8 of the APAP 1.1. After that, the pushing mechanism 31 of the storage shuttle 5 with the cam 32 begins to push into the U-shaped stop 33 mounted at the bottom of the parcelbox 4, which causes the parcelbox 4 to move towards the external port 8 of ACCV 1.2, at which the driven roller-conveyor 19 is installed during the dock;

b) Parcelbox 4 moves along the directing guides 29 of the warehouse shuttle 5, on its longitudinal rails 12 (FIG. 9 *b*). The pushing mechanism 31 of the warehouse shuttle 5 (FIG. 9 *b*) uses 2 cams 32. This allows the parcelbox 4 to be pushed off the directing guides 29 when pushing in both directions since one of the cams 32 is constantly engaged with the corresponding U-shaped stop 33 until the moment of pushing.

c) The driven roller-conveyor 19 receives the moved parcelbox 4 and positions it onto the ACCV 1.2 in such a way that the warehouse shuttle 4 of the ACCV 1.2 can load it and transport it to a predetermined location on the warehouse shelving racks 3 of the ACCV. In one embodiment of the implementation of the conveyor 19, the conveyor 19 is short enough that the ACCV 1.2 pusher cam 32 engages the front U-stop 33 of the parcelbox 4, while the rear U-stop 33 of the parcelbox 4 is not yet disengaged by cam 32 in APAP 1.1, and is thus pulled into ACCV 1.2. In another implementation, as shown in FIG. 15, parcelbox 4 from ACCV 1.2 travels over conveyor bridge 19 to port 8 in APAP 1.1. The movement of the parcelbox 4 is controlled by an absolute encoder mounted on the gear motor of the conveyor-bridge 19. A laser photosensor 54 is installed at the input of the external port 8 of the APAP 1.1. When the parcelbox 4 crosses the laser beam to the photosensor 54, the pushing mechanism 31 is started, the servo-drive of which is also equipped with an absolute encoder. The pushing mechanism 31 begins to move in such a way that the horizontal speed of the cam 32 mounted on it matches the speed of movement of the parcelbox 4 along the conveyor-bridge 19. In this case, cam 32 enters the front U-shaped stop on the bottom of parcelbox 4. The drive of the conveyor bridge 19 and the drive of the pushing mechanism 31 work synchronously until the parcelbox 4 is moved to warehouse robot 5. In another version, the long roller-conveyor 19 is driven one (has motors with gearboxes) and also has side stops, for the parcelbox 4 do not accidentally slide off the conveyor 19 when the parcelbox 4 was transferred along a long conveyor 19 between the docked APLMs.

d) To unload parcelbox 4 from ACCV 1.2 to APAP 1.1, the transfer steps are performed in reversed order. The warehouse shuttle 5 of the ACCV 1.2 places the parcelbox 4 onto the roller-conveyor 19 through the external port 8 of the ACCV 1.2. The roller-conveyor 19 starts moving the parcelbox 4 towards the warehouse shuttle 5 of the APAP 1.1. At the same time, the chain pusher 31 begins to move in such a way that the cam 32 of the pushing mechanism 31 enters the U-shaped stop 14 of the parcelbox 4. The roller-conveyor 19 and the chain pusher 31 move synchronously until the parcelbox 4 is fully loaded onto the warehouse shuttle 5. The warehouse shuttle 5 then places the parcelbox 4 onto warehouse shelving-racks 3 of the APAP 1.1.

2. method. Using a special rail jumper-bridge 35 between the rails of warehouse shelving-racks 3 between the first and the second APLMs (FIG. 11). The parcelbox 4 is moved from one APLM to another APLM by a warehouse shuttle 5 moving from one APLM to the other APLM. An example of the implementation of such an automatic transfer is presented in FIG. 11. Warehouse shuttles 5 can be transported with parcelboxes 4 from one APLM module to another. Shuttles 5 move through the installed jumper bridge from the APLM to ACCV. Preferably, ACCVs did not have their own warehouse shuttles, because transportation of warehouse shuttles in ACCVs requires additional technical means that fix them, and the shuttles 5 also need to be periodically charged. At the same time, shuttles 5 are used for a short time, and most of the time they will simply stand being locked when the ACCV is moving. The shuttle 5 may only need to be transported into ACCV when using the first transfer method, parcelbox 4 pushing. In the case of the APNN module, each APNN 1.3 level has its own warehouse shuttle 5, preferably, a multi-seated one (FIG. 9). It carries out the transportation of parcelboxes 4, moving from one APLM to another through a jumper-bridge. After moving all parcelboxes 4, shuttle 5 moves back to its stationary APLM, therefore, there are no warehouse shuttles left in the ACCV. The multi-level connection by multiple jumper-bridges 35 makes sense for reloading parcelboxes more quickly, which is ensured by the presence of warehouse shuttles 5 at each level of the APNN. Although the entire transfer of parcelboxes can be carried out by a single warehouse shuttle 5, which uses elevator-robot 7 of a stationary APLM, such transfer by a single shuttle 5 will be slow.

When the ACCV 1.2 has already positioned to the APNN 1.3 (APAP) in such a way that the external port 8 of the ACCV 1.2 is located precisely to the external port 8 of APNN 1.3 (FIG. 10 c), then, at the same time, the rail-guides for moving the warehouse shuttle 4 of the racks 3 of one and the second APLM are located opposite each other. The rail jumper 35, fixed on storage racks 3 APNN 1.3, is moved by a gear-motor 34 under the control of APNN's internal control system 27 in direction 39 from vertical to the horizontal position, pressing from below to the rail guides of warehouse shelving-racks 3 of the ACCV 1.2 (FIG. 11 a). To compensate for residual positioning errors and for fixing purposes, rail-jumper 35 is locked with two locks 36 (FIG.

10 b). In the process of locking, the drive shaft of lock 36 is rotated by the gear motor in the direction 40, pressing the rail guide of the warehouse racks 3 of the ACCV 1.2 to the special rail-jumper 35 with the finger of the lock 36. In this case, the cams 35 of the locks 36 clamp together the rail guides of the warehouse racks 3 ACCV 1.2, precisely matching the guides with the rail jumper 35. To drive shuttle 5 through the gaps formed between the rail jumper 35 and rack guides 3, warehouse shuttles 5 are equipped with twin wheels 38 (FIG. 11 c), which allow passing through gaps in the rail guides with a size smaller than the distance between the centers of the wheels.

In the presented example, the rail jumper bridge 35 connection between the rail guides of racks 3 of APNN 1.3 and ACCV 1.2 is implemented at several levels (rack floors) (FIG. 12). Each level has its multi-seat warehouse shuttle 5. After installing the jumper-bridge 35, the warehouse shuttle 5 loads several pre-delivered parcelboxes 4 from racks 3 of the APNN 1.3. Through the installed jumper-bridge 35, the warehouse-shuttle 5 moves to the corresponding level of racks 3 of the ACCV 1.2. The warehouse-shuttle 5 loads one or several parcelboxes 4 from the ACCV 1.2 shelving 3 onto itself. It loads the parcelboxes 4 brought from APNN 1.3 into the vacant rack positions of the ACCV 1.2, after which the shuttle 5 moves back to racks 3 of APNN 1.3 through the jumper 35. In APNN 1.3, warehouse shuttle 5 unloads parcelboxes 4 from ACCV 1.2, and here it loads for exchanging other parcelboxes for transferring to the ACCV. The parcelbox exchange process is repeated until the complete reload of prepared parcelboxes 4 from APNN 1.3 to ACCV 1.2, and backward, is done. Since the bridged connection is multi-level, the transfer of parcelboxes 4 by several warehouse shuttles 5 can be carried out independently in parallel at each rack level. This provides a high speed of parcelboxes 4 exchange between the APNN 1.3 and the ACCV 1.2. It is preferable to keep warehouse-shuttles 5 in the stationary APNN 1.3, therefore, they will not be transported for keeping to the mobile ACCV 1.2.

Managing parcelboxes at user's place, loading/unloading postal items into/from parcelboxes. A parcelbox 4, placed onto the warehouse robot 5, is delivered by the robot-elevator 7 to the external port 8 of the APAP 1.1 until the cover 10 of the parcelbox 4 comes into contact with the cover latch 11. The latch 11 fixes the parcelbox cover 10, then the robot-elevator 7 is lowered. In such way, the parcelbox cover 10 is removed from parcelbox 4 (FIG. 8c). The APAP security door 9 opens. Thereafter, the pushing mechanism 31 of the warehouse shuttle 5 begins to push by the cam 32 matched into the U-shaped stop 33 on the bottom side of the parcelbox 4, which causes the parcelbox 4 to move towards the user's place 6 for loading and/or unloading postal items 26 in and/or out of the parcelboxes 4. At the user's place, a roller section is fixed with guides 29 to fix the parcelbox 4 from transverse movements. In the standard version, the roller section (19) is non-driven and shorter than the parcelbox 4. The movement-out of the parcelbox 4 is provided and controlled by the pusher mechanism 31 of the storage shuttle 5. In this case, the parcelbox 4 is not fully pushed out from the APAP, but remains by its small part within the APAP, because of the engagement with the cam 32 of the pusher mechanism 31.

If it is necessary to move the parcelbox 4 (or the warehouse shuttle 5 with the parcelbox 4 on it) to the user's place 6 at a longer distance, then a driven roller section can be employed, where a gear-motor with an absolute encoder, and rollers with a drive built into them, or other drive mechanisms can be used as a driving means of the roller-section.

After performing the operations of unloading and loading postal items 26, correspondingly out and into of the parcelbox 4, the pushing mechanism 31 returns the parcelbox 4 back onto warehouse shuttle 5. The elevator robot 7 rises the shuttle 5 up, until the parcelbox cover 10 is covered onto the top of parcelbox 4. After that, parcelbox 4 is delivered to warehouse shelving racks 3.

The warehouse shuttle 5 can also be used to deliver the parcelbox 4 to the place of loading and unloading of parcels or postal items 21, i.e., end-users place (FIG. 8*c*). At the same time, after removing the parcelbox cover 10 from top of the parcelbox 4, the warehouse shuttle 5 moves the parcelbox to its directing-guides, and moves along said guides to the place 6 for loading and unloading of parcels 21. After performing operations of unloading/loading postal items (21), the warehouse shuttle 5 with the parcelbox 4 returns back onto the robot-elevator 7, after that placement of the parcelbox cover 10 is performed on top of the parcelbox 4, and then the closed parcelbox 4 is delivered to the shelving racks 3 of the APAP 1.1.

Transportation of closed parcelbox and opening it to the user. During transportation in the present automated postal system, the parcelbox 4 is always covered (closed) with its top cover 10. At the same time, the postal service personnel does not have access to the location of the parcelbox 4 (except for dedicated technical staff when dealing with technical issues and emergencies of the service). In the process of commuting the parcelbox 4 from one APLM 1 to another, the conveyor-bridge (19) between these APLMs has external protection means against adverse weather events and unauthorized access in the form of protective barriers, which are protective doors (9) of the APLM in the open state (FIG. 14). Parcelbox 4 is opened only when it is pushed out for loading and unloading the postal item 26 (e.g., parcel), and the parcelbox cover 10 meanwhile is pulled-up inside the servicing APAP (FIG. 8*c*) by the cover latch 11, for example, an electromagnet. Thus, the opened parcelbox 4 is partly pushed out through the external port 8 to the user. It should be noted, that the parcelbox is not fully pushed out from the APAP, but a small part of it remains inside the APAP, being fixed by the cam 32 of the pushing mechanism 33. During keeping the parcelbox 4 on warehouse rack 3, the parcelbox cover (lid) is prevented from opening by the upper height-limiting structure of the shelving rack 3.

Example sequence of the automated postal delivery. Below an example sequence of methodical operations (detailed steps), when forwarding a postal item through the automatic postal system (network, Automated Postal Delivery Network, APDN), is presented:

1. A request is received from a user at the APAP 1.1 user's place, to deliver a postal item 26 through the automated postal delivery service;
2. Warehouse shuttle 5 picks-up an empty parcelbox 4 from shelving racks 3 located in warehouse 2;
3. The warehouse shuttle 5 drives onto the commuting robot (elevator) 7, which further delivers the shuttle 5 to the external port 8 at the APAP user's place;
4. Using the electromagnetic latch device 11, the cover 10 of parcelbox 4 is removed and remains latched inside the APAP;
5. The APAP management system 27 opens security door 9 at the user's place 6, for loading and/or unloading postal items 26 into and out parcelbox 4;
6. The warehouse shuttle 5 pushes the pushing mechanism 31 of the parcelbox 4 towards the open security door 9 so that the parcelbox 4 remains engaged with the pusher cam 32, which controls the position of the parcelbox 4. The parcelbox 4 is put forward on the non-driven conveyor to the user's place 6. At the same time, the open parcelbox 4 becomes available for loading postal items 26 into it;

7. A postal item 26 is loaded by the user into the parcelbox 4, afterwards, a message is given to the APAP 1.1 control system 27 by the user, that unloading and/or loading of the postal item 26 is completed;
8. The pushing mechanism 31 of the warehouse shuttle 5, with the pusher cam 32 engaged with the parcelbox 4, pulls the parcelbox 4 (with postal item 26) back onto the warehouse shuttle 5;
9. The commuting robot 7 lifts the parcelbox 4 up until the parcelbox-cover 10 is put onto the parcelbox 4, after that the latching-device 11 releases the cover 10 onto the parcelbox 4;
10. The commuting robot 7 delivers the warehouse shuttle 5 to the warehouse 2;
11. The warehouse shuttle 5 unloads the parcelbox 4 to a free position on the rack 3, for temporary storage;
12. A designated ACCV 1.2 arrives at the APAP 1.1;
13. The ACCV 1.2 positions itself to the external port 8 of the APAP 1.1;
14. Both APAP 1.1 and ACCV 1.2 open security doors 9, at the same time, a conveyor-bridge 19 is installed between them;
15. APAP warehouse shuttle 5 loads the parcelbox 4 onto itself;
16. Warehouse shuttle 5 calls the commuting robot 7, drives onto it, which further delivers the shuttle 5 to the APAP external port 8;
17. Warehouse shuttle 5 pushes the parcelbox 4 with the pusher mechanism 31 towards the open security door 9. At the same time, conveyor-bridge 19 receives parcelbox 4 and delivers it to the ACCVs warehouse 2;
18. ACCV warehouse shuttle 5 using its pushing mechanism 31, picks-up the parcelbox 4 onto itself and delivers to a free rack position at the ACCV warehouse 2.
19. The ACCV completes parcelbox reloading, closes its security door 9, and then moves to a designated APNN 1.3;
20. The arrived ACCV positions itself to external port 8 of the designated APNN 1.3;
21. Both APNN 1.3 and ACCV 1.2 open security doors 9, at the same time, a conveyor-bridge 19 is installed between them;
22. ACCV warehouse shuttle 5 picks-up parcelbox 4 from ACCV warehouse rack 3 and moves it to conveyor-bridge 19;
23. The ACCV shuttle 5 pushes by pusher mechanism 31 the parcelbox 4 to the conveyor-bridge 19;
24. The conveyor-bridge 19 delivers parcelbox 4 from the ACCV into APNN 1.3;
25. APNN shuttle 5 using its pushing mechanism 31 loads the parcelbox 4 onto itself, and delivers it to a free rack position in the APNN warehouse 2;
26. Another designated ACCV 1.2 arrives at APNN 1.3, to transport parcelboxes to the next APNNs on the postal delivery route;
27. The ACCV 1.2 positions itself to the next APNN multi-level external port 8;
28. APNN warehouse shuttle 5 moves the parcelbox 4 to racks 3 in front of the multi-level port 8, in advance;
29. Both APNN 1.3 and ACCV 1.2 open security doors 9, whereby creating a protective fence around the parcelbox transfer path;

30. APNN 1.3 installs rail-jumpers 35 between the corresponding levels of warehouse racks 3 of APNN 1.3 and ACCV 1.2, and locks the installed rail-jumpers 35 with locks 36;

31. APNNs multi-seat warehouse shuttles 5, located at each level of APNN racks 3, load parcelboxes 4, located on ACCV racks 3 opposite the multi-level port 8 of APNN 1.3;

32. APNN multi-seat shuttle 5 moves to the ACCV warehouse through the rail-jumper 35 and places parcelbox 4 in free positions of the ACCV racks 3, and then the multi-seat shuttle 5 leaves back to the APNN 1.3;

33. Upon completion of reloading parcelboxes, the ACCV closes security door 9 and drives to another designated APNN 1.3, where it unloads parcelbox 4 in the same way;

34. The procedure of moving parcelbox 4 through the route of APNN network is repeated, until the parcelbox 4 reaches a designated APNN 1.3 next to APAP 1.1 which is the final destination of delivery;

35. The parcelbox 4 is loaded through the conveyor-bridge 19 into the ACCV 1.2, which then moves to the final destination APAP 1.1;

36. The ACCV 1.2 positions itself to the external port 8 of APAP 1.1;

37. Both APAP 1.1 and ACCV 1.2 open security doors 9, at the same time, a conveyor jumper 19 is formed between them;

38. The ACCV warehouse shuttle 5 picks up parcelbox 4 from ACCV warehouse 2 and moves the parcelbox to conveyor-bridge 19;

39. ACCV warehouse shuttle 5 pushes by the pusher mechanism 31 parcelbox 4 to the conveyor-bridge 19;

40. The conveyor bridge 19 delivers the parcelbox 4 to the APAP warehouse shuttle 5, which then allocates itself onto the commuting robot 7 at the external port 8 of the APAP 1.1;

41. APAP warehouse shuttle 5 loads the parcelbox 4 onto itself, and then, using the commuting robot 7, delivers the parcelbox to the APAP racks 3, for temporary storage;

42. A message is sent to the recipient of the postal item 26, informing him that the postal item 26 has arrived to the APAP, at the user's address/location;

43. The recipient-user arrives at APAP to take the postal item 26; the user is identified by the ADPN control systems 27, 412; the warehouse shuttle 5 loads the designated parcelbox 4 from racks 3 of warehouse 2;

44. APAP shuttle 5, using the commuting robot 7, delivers parcelbox 4 to the external port 8 of the APAP;

45. The removal of the parcelbox cover 10 is performed, using the cover latch 11, inside the APAP;

46. The APAP internal control system 27 opens the security door 9 for the user's place 6, for loading/unloading postal items 26 into/out of the parcelbox 4;

47. APAP shuttle 5 pushes the pusher mechanism 31 of the parcelbox 4 towards the open security door 9 so that the parcelbox 4 remains engaged with the pusher cam 32, which controls the position of the parcelbox 4. The parcelbox 4 is pushed-out onto the non-driven conveyor-bridge, to the user's place 6. In this case, the open parcelbox 4 allows the user to take out from it the postal item 26;

48. The delivered postal item 26 is taken our by the receiving user from parcelbox 4. Then, a message is given to the APAP's internal control system, by the user, that upload of a new postal item 26 is also complete, or is not required;

49. The pusher mechanism 31 of the warehouse shuttle 5, with the pusher cam 32 engaged to the parcelbox 4, pulls the parcelbox 4 (empty with the newly loaded item 26) back onto the warehouse shuttle 5;

50. The APAP commuting robot 7 lifts the parcelbox 4 up until the parcelbox cover 10 is put onto the top of the parcelbox 4, after which the cover-latching device 11 releases the cover 10;

51. The commuting robot 7 delivers the warehouse shuttle 5 to warehouse 2 of the APAP;

52. The warehouse shuttle 5 transfers the empty parcelbox 4 (or loaded with a new postal item 26) into a free rack space of the warehouse, for temporary storage.

It should be noted, that this exemplary algorithmic sequence of the method operations and the technical means used (robots 5, 7, and other technical elements of the postal delivery system), by its entirety of details, is not the basis for the limitation for the claims. This sequence is specific and serves for the clarity and sufficiency of the disclosure of the invention as a method of automatic transmission of parcelboxes 4 through the automated postal delivery network (APDN). It should be noted that all the steps of the method and the operations in this sequence are continuously controlled by the computer control system 41 of the automated postal delivery network (APDN), in combination with the internal control systems 27 of individual APLMs of all types.

The following numbered clauses present some embodiments and combinations thereof. Further features from the specification may be combined with one or more of the items.

1. A system for postal delivery services, comprising plurality of automated postal logistic modules APLMs (1), each APLM comprising at least:
   a warehouse (2) with an shelving (3) for parcelboxes (4), the shelving (3), preferably, arranged in one or more rack rows, and/or one or more rack levels,
   at least one external port (8) for loading the parcelboxes (4) into and out of the warehouse (2), with a security door (9) limiting access through the external port (8),
   one (5) or more robotic modules (5, 7) within the warehouse (2), for moving parcelboxes (4) among said shelving racks (3), and for commuting parcelboxes (4) through the external port (8),
   wherein at least two APLM (1) in the plurality are configured to operate as
   an Automated Postal Access Point APAP (1.1) for postal service users to send and receive postal items (26) in the parcelboxes (4) and/or Automated Postal Network Node APNN (1.3) for intermediate storage of the parcelboxes (4) within the postal system, and Automated Cargo Compartment on a postal Vehicle ACCV (1.2), wherein the APLM is implemented on a postal vehicle transporting parcelboxes (4) among and between any type APLMs (1),
   wherein APLMs (1) of the postal delivery are monitored and controlled by APLM's internal control (27) means and general control means of the postal system (41),
   wherein the system further comprises automated means for exchanging parcelboxes (4) between the ACCV (1.2) and other APLM (1, 1.1, 1.2, 1.3) through external ports (8), said automated exchange means comprise
   1) automated means for positioning external ports (8) of the ACCV (1.2) and other APLMs each other, for cross-docking and commuting parcelboxes (4) between the ACCV (1.2) and other APLM, 2) automated means for cross-docking ACCV (1.2) and other APLM, for commuting parcelboxes (4) between the ACCV (1.2) and other APLM, 3) automated means for loading and commuting parcelboxes (4) within warehouses (2) and through the cross-docking means configured beforehand between the ACCV (1.2) and other APLM.

2. The system according to clause 1, wherein the APLM comprises one or more robotic modules (5, 7) inside the warehouse (2), at least two types wherein one or more robot is warehouse shuttle (5) arranged to move along the warehouse shelving rows (3) picking and placing parcelboxes (4);

one or more robot is commuting robot (7) arranged to transfer parcelboxes (4) between the warehouse shuttles (5) and to the APLM external port (8).

3. The system according to clause 2, wherein said commuting robots (7) commute parcelboxes (4) or one or more warehouse shuttles (5) between shelving rows (3), and with the APLM external port (8), by following directions:

elevating and lowering vertically, to service more than one shelving (3) floors of the APLM warehouse (2);

moving horizontally, to service more than one shelving rows (3) of the APLM warehouse (2);

moving both vertical and horizontally, to service more than one shelving (3) floor and more than one shelving (3) row of the APLM warehouse (2).

4. The system according to clause 1, wherein the APLM positioning means of the external ports (8) comprise wheelguides (16), wheel drive limiters, positioning supports (18), arranged for positioning the ACCV nearby the other APLM (1), and retractable jacks (17) installed in ACCVs, for positioning external ports (8) to be cross-docked, wherein said positioning supports (18) and retractable jacks (17) have cone-shaped or sphere-shaped coupling surfaces for self-positioning.

5. The system according to clause 1, wherein the positioning means are proximity and 3D-positioning arrangements such as laser, lidar, proximity sensors such as ultrasonic sensors, distance meters, computer-vision means such as video cameras.

6. The system according to any of preceeding clauses, wherein the automated cross-docking and transfer means for parcelbox commuting between cross-docked ACCV (1.2) and other APLM (1) are at least one connecting rolling-conveyor-bridge (19) configurable between the positioned external ports (8) of the ACCV (1.2) and other APLM.

7. The system according to any of preceeding clauses, wherein the automated cross-docking means of the positioned ACCV (1.2) and other APLM (1) are one or more rail-jumper bridge (35), configurable to connect directly shelving racks (3) of ACCV (1.2) and other APLM, for direct transferring parcelboxes (4) through said connected shelving racks (3) between the cross-docked ACCV (1.2) and other APLM.

8. The system according to clauses 1 and 7, wherein the automated cross-docking means are electro-mechanical arrangements of the warehouse shelving (3) configurable between one or more than one pair of positioned shelving rows (3) of the ACCV (1.2) and other APLM, such as rail-jumper bridge (35), gear-motor (34), and lock (36).

9. The system according to any of preceeding clauses, wherein the automated parcelbox loading means onto/from the warehouse shuttle (5) and the commuting robot (7) are electro-mechanical arrangements comprising at least parcelbox pushing mechanism (31) with a pusher cam (32), and cam-matching U-shaped stop (33) on the bottom of the parcelbox.

10. The system according to clauses 1 to 7, wherein postal items (26) through the plurality of APLMs are delivered in closed parcelboxes (4), wherein the parcelbox (4) is covered with parcelbox top-cover (10) wherein said top-cover 10 is uncoverable, for example, by means of an electromagnetic latch (11), before pushing the parcelbox (4) out of the APAP (1.1) at the user's place (6).

11. The system according to clauses 1 to 7, wherein the external ports (8) of any APLM are arranged and configurable for commuting parcelboxes (4) to other positioned APLM by either warehouse robotic modules (5, 7), distributing parcelboxes (4) via the external port (8) and its open security door (9) through a single conveyor-bridge (19) or a single rail-jumper bridge (35), cross-docked to other APLM;

or using more than one rack (3) rows, each one comprising bridged by rail-jumpers (35) rack rows (3) of the positioned ACCV (1.2) and other APLM, wherein each bridged rack row involves at least one warehouse shuttle (5) to commute parcelboxes between the ACCV (1.2) and other APLM.

12. The system according to any of preceding clauses, wherein the external ports (8) of APLMs are arranged to load/unload parcelboxes (4)

by the commuting robot (7) of the warehouse (2), said robot (7) distributing parcelboxes (4) between the warehouse shuttles (5) and the APLMs external ports (8), or through individual shelving rows (3), bridged between more than one pair of shelvings (3) of the ACCV (1.2) and other APLM, by means of shelving robots (5).

13. A method for delivery of postal items (26) within parcelboxes (4) through the plurality of APLM (1) according to clauses 1 to 12, wherein the parcelboxes (4) are commuted between a couple of an ACCV (1.2) and any other APLM (1, 1.1, 1.2, 1.3) such as APAP (1.1), APNN (1.3), or ACCV (1.3), the method comprising steps of:

A. positioning the ACCV (1.2) to other APLM (1), for cross-docking them by using the positioning means of the external ports (8) of the ACCV (1.2) and other APLM;

B. cross-docking the ACCV (1.2) to other APLM (1, 1.1, 1.2, 1.3), by using the automated cross-docking and parcelbox (4) transfer means (52), such as, a conveyor-bridge (19), or one or more rail-jumper bridges (35) between positioned shelving (3) rows of the ACCV (1.2) and other APLM (1, 1.1, 1.2, 1.3);

C. loading one or more parcelboxes (4) from warehouse shelving rack (3) of ACCV (1.2) or APLM, onto the parcelbox transfer means, for automated commuting parcelboxes to other APLMs;

D. unloading one or more parcelbox (4) received from other APLM through parcelbox transfer means, into shelving rack (3) of the accepting ACCV (1.2) or APLM.

E. Transferring one or more parcelboxes (4) by a warehouse shuttle (5) directly through cross-docked at least one pair of rack-rows (3) between cross-docked ACCV and other APLM.

14. The method according to clause 13, wherein steps C and D are implemented by the commuting-robots (7) of the ACCV (1.2) and other APLM (1), by commuting parcelboxes (4) onto and from the conveyor-bridge (19), thereby moving parcelboxes (4) between the ACCV (1.2) and other APLM (1).

step E is implemented by at least one warehouse shuttle (5) of the cross-docked ACCV (1.2) and other APLM (1), moving parcelboxes (4) along the connected shelving racks (3), afterwards, said at least one warehouse shuttle (5) returns back to the initial positions.

15. The method according to clause 13, wherein it further comprises steps of

F. delivery of the postal item (26) by a user, wherein the delivery is done by placing the postal item (26) into an open parcelbox (4), being pushed out from the APAP (1.1), and subsequently the parcelbox (4) is retracted back into the APAP (1.1), closed internally in the APAP (1.1) with its cover 10, and placed onto the APAP warehouse shelve (3), for further automated commuting;

G. receipt of the postal item (26) by a user, wherein the receipt is be done by taking the postal item (26) by the user out of the open parcelbox (4), being opened beforehand internally in the APAP (1.1) and pushed out from the APAP, and subsequently the emptied parcelbox (4) is retracted back into the APAP (1.1), closed internally in the APAP (1.1) with its cover 10, and transferred onto the APAP warehouse shelve (3).

The invention claimed is:

1. A system for postal delivery services, comprising a plurality of automated postal logistic modules APLMs, each APLM comprising at least:

a warehouse with a shelving rack for parcelboxes, at least one external port for loading the parcelboxes into and out of the warehouse, with a security door limiting access through the external port, one or more robotic modules within the warehouse, for moving parcelboxes among said shelving racks, and for commuting parcelboxes through the external port, wherein at least two APLM in the plurality are configured to operate as an Automated Postal Access Point APAP for postal service users to send and receive postal items in the parcelboxes and/or Automated Postal Network Node APNN for intermediate storage of the parcelboxes within the postal system, and Automated Cargo Compartment on a postal Vehicle ACCV, wherein the APLM is implemented on a postal vehicle transporting parcelboxes among and between any type APLMS, wherein APLMs of the postal delivery are monitored and controlled by APLM's internal controller and a general controller of the postal system, wherein the system further comprises an automated device for exchanging parcelboxes between the ACCV and other APLM through external ports, said automated exchange device comprising 1) an automated device for positioning external ports of the ACCV and other APLMs each other, for cross-docking and commuting parcelboxes between the ACCV and other APLM, 2) an automated device for cross-docking ACCV and other APLM, for commuting parcelboxes between the ACCV and other APLM, 3) an automated device for loading and commuting parcelboxes within warehouses and through the cross-docking device configured beforehand between the ACCV and other APLM, wherein the automated parcelbox loading device onto/from a warehouse shuttle and the commuting robot are electro-mechanical arrangements comprising at least parcelbox pushing mechanism with a pusher cam, and cam-matching U-shaped stop on the bottom of the parcelbox.

2. The system according to claim 1, wherein the APLM comprises one or more robotic modules inside the warehouse, at least two types wherein one or more robot is warehouse shuttle arranged to move along the warehouse shelving rows picking and placing parcelboxes;

one or more robot is commuting robot arranged to transfer parcelboxes between the warehouse shuttles and to the APLM external port.

3. The system according to claim 2, wherein said commuting robots commute parcelboxes or one or more warehouse shuttles between shelving rows, and with the APLM external port, by following directions:

elevating and lowering vertically, to service more than one shelving floors of the APLM warehouse;

moving horizontally, to service more than one shelving rows of the APLM warehouse;

moving both vertical and horizontally, to service more than one shelving floor and more than one shelving row of the APLM warehouse.

4. The system according to claim 1, wherein the APLM positioning device of the external ports comprise wheel-guides, wheel drive limiters, positioning supports, arranged for positioning the ACCV nearby the other APLM, and retractable jacks installed in ACCVs, for positioning external ports to be cross-docked, wherein said positioning supports and retractable jacks have cone-shaped or sphere-shaped coupling surfaces for self-positioning.

5. The system according to claim 1, wherein the positioning device are proximity and 3D-positioning arrangements, proximity sensors, computer-vision device.

6. The system according to claim 1, wherein the automated cross-docking and transfer device for parcelbox commuting between cross-docked ACCV and other APLM are at least one connecting rolling-conveyor-bridge configurable between the positioned external ports of the ACCV and other APLM.

7. The system according to claim 1, wherein the automated cross-docking device of the positioned ACCV and other APLM are one or more rail-jumper bridge, configurable to connect directly shelving racks of ACCV and other APLM, for direct transferring parcelboxes through said connected shelving racks between the cross-docked ACCV and other APLM.

8. A system for postal delivery services, comprising a plurality of automated postal logistic modules APLMs, each APLM comprising at least:

a warehouse with a shelving rack for parcelboxes, at least one external port for loading the parcelboxes into and out of the warehouse, with a security door limiting access through the external port, one or more robotic modules within the warehouse, for moving parcelboxes among said shelving racks, and for commuting parcelboxes through the external port, wherein at least two APLM in the plurality are configured to operate as an Automated Postal Access Point APAP for postal service users to send and receive postal items in the parcelboxes and/or Automated Postal Network Node APNN for intermediate storage of the parcelboxes within the postal system, and Automated Cargo Compartment on a postal Vehicle ACCV, wherein the APLM is implemented on a postal vehicle transporting parcelboxes among and between any type APLMs, wherein APLMs of the postal delivery are monitored and controlled by APLM'S internal controller and a general controller of the postal system, wherein the system further comprises an automated device for exchanging parcelboxes between the ACCV and other APLM through external ports, said automated exchange device comprising 1) An automated device for positioning external ports of the ACCV and other APLMs each other, for cross-docking and commuting parcelboxes between the ACCV and other APLM, 2) An automated device for cross-docking ACCV and other APLM, for commuting parcelboxes between the ACCV and other APLM, 3) An automated device for loading and commuting parcelboxes within warehouses and through the cross-docking device configured beforehand between the ACCV and other APLM, wherein the automated cross-docking device comprises electro-mechanical arrangements of the warehouse shelving configurable between one or more than one pair of positioned shelving rows of the ACCV and other APLM.

9. A system for postal delivery services, comprising a plurality of automated postal logistic modules APLMs, each APLM comprising at least:

a warehouse with a shelving rack for parcelboxes, at least one external port for loading the parcelboxes into and out of the warehouse, with a security door limiting access through the external port, one or more robotic modules within the warehouse, for moving parcelboxes among said shelving racks, and for commuting parcelboxes through the external port, wherein at least two APLM in the plurality are configured to operate as an Automated Postal Access Point APAP for postal service users to send and receive postal items in the parcelboxes and/or Automated Postal Network Node APNN for intermediate storage of the parcelboxes within the postal system, and Automated Cargo Compartment on a postal Vehicle ACCV, wherein the APLM is implemented on a postal vehicle transporting parcelboxes among and between any type APLMs, wherein APLMs of the postal delivery are monitored and controlled by APLM'S internal controller and a general controller of the postal system, wherein the system further comprises an automated device for exchanging parcelboxes between the ACCV and other APLM through external ports, said automated exchange device comprising 1) An automated device for positioning external ports of the ACCV and other APLMs each other, for cross-docking and commuting parcelboxes between the ACCV and other APLM, 2) An automated device for cross-docking ACCV and other APLM, for commuting parcelboxes between the ACCV and other APLM, 3) An automated device for loading and commuting parcelboxes within warehouses and through the cross-docking device configured beforehand between the ACCV and other APLM, wherein postal items through the plurality of APLMs are delivered in closed parcelboxes, wherein the parcelbox is covered with parcelbox top-cover wherein said top-cover is uncoverable before pushing the parcelbox out of the APAP at the user's place.

10. The system according to claim 1, wherein the external ports of any APLM are arranged and configurable for commuting parcelboxes to other positioned APLM by either warehouse robotic modules, distributing parcelboxes via the external port and its open security door through a single conveyor-bridge or a single rail-jumper bridge, cross-docked to other APLM;

or using more than one rack rows, each one comprising bridged by rail-jumpers rack rows of the positioned ACCV and other APLM, wherein each bridged rack row involves at least one warehouse shuttle to commute parcelboxes between the ACCV and other APLM.

11. The system according to claim 1, wherein the external ports of APLMs are arranged to load/unload parcelboxes by the commuting robot of the warehouse, said robot distributing parcelboxes between the warehouse shuttles and the APLMs external ports, or through individual shelving rows, bridged between more than one pair of shelvings of the ACCV and other APLM, by means of shelving robots.

12. A method for delivery of postal items within parcelboxes through the plurality of APLM according to claim 1, wherein the parcelboxes are commuted between a couple of an ACCV and any other APLM, the method comprising steps of:

A. positioning the ACCV to other APLM, for cross-docking them by using the positioning device of the external ports of the ACCV and other APLM;

B. cross-docking the ACCV to other APLM, by using the automated cross-docking and parcelbox transfer device between positioned shelving rows of the ACCV and other APLM;

C. loading one or more parcelboxes from warehouse shelving rack of ACCV or APLM, onto the parcelbox transfer device, for automated commuting oarcelboxes to other APLMs;

D. unloading one or more parcelbox received from other APLM through parcelbox transfer device, into shelving rack of the accepting ACCV or APLM;

E. Transferring one or more parcelboxes by a warehouse shuttle directly through cross-docked at least one pair of rack-rows between cross-docked ACCV and other APLM.

13. The method according to claim 12, wherein steps C and D are implemented by the commuting-robots of the ACCV and other APLM, by commuting parcelboxes onto and from the conveyor-bridge, thereby moving parcelboxes between the ACCV and other APLM;

step E is implemented by at least one warehouse shuttle of the cross-docked ACCV and other APLM, moving parcelboxes along the connected shelving racks, afterwards, said at least one warehouse shuttle returns back to the initial positions.

14. The method according to claim 12, wherein it further comprises steps of F. delivery of the postal item by a user, wherein the delivery is done by placing the postal item into an open parcelbox, being pushed out from the APAP, and subsequently the parcelbox is retracted back into the APAP, closed internally in the APAP with its cover 10, and placed onto the APAP warehouse shelve, for further automated commuting;

G. receipt of the postal item by a user, wherein the receipt is be done by taking the postal item by the user out of the open parcelbox, being opened beforehand internally in the APAP and pushed out from the APAP, and subsequently the emptied parcelbox is retracted back into the APAP, closed internally in the APAP with its cover 10, and transferred onto the APAP warehouse shelve.

15. The system of claim 9, wherein the top-cover is configured to be uncoverable by an electromagnetic latch.

16. The method of claim 12, wherein the APLM comprises APAP, APNN, or ACCV.

17. The method of claim 12, wherein the parcelbox transfer device comprises a conveyor bridge or a rail jumper bridge.

18. The system according to claim 2, wherein the automated cross-docking and transfer device for parcelbox commuting between cross-docked ACCV and other APLM are at least one connecting rolling-conveyor-bridge configurable between the positioned external ports of the ACCV and other APLM.

19. The system according to claim 3, wherein the automated cross-docking and transfer device for parcelbox commuting between cross-docked ACCV and other APLM are at least one connecting rolling-conveyor-bridge configurable between the positioned external ports of the ACCV and other APLM.

* * * * *